(12) United States Patent
Araie et al.

(10) Patent No.: US 8,736,990 B2
(45) Date of Patent: May 27, 2014

(54) ATTACHMENT STRUCTURE AND LENS UNIT

(71) Applicant: Panasonic Corporation, Osaka (JP)

(72) Inventors: Keiji Araie, Osaka (JP); Akio Konishi, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/734,405

(22) Filed: Jan. 4, 2013

(65) Prior Publication Data

US 2013/0265662 A1 Oct. 10, 2013

(30) Foreign Application Priority Data

Apr. 4, 2012 (JP) ................................. 2012-085841

(51) Int. Cl.
 *G02B 7/02* (2006.01)
(52) U.S. Cl.
 USPC ............................ 359/827; 359/819; 359/811
(58) Field of Classification Search
 USPC .................... 359/827, 819, 811, 642
 See application file for complete search history.

(56) References Cited

U.S. PATENT DOCUMENTS

| 5,416,549 A | 5/1995 | Katsuyama et al. |
| 8,283,621 B2 * | 10/2012 | Tatsuzawa et al. ............ 250/216 |
| 2008/0205881 A1 | 8/2008 | Sakurai |

FOREIGN PATENT DOCUMENTS

| JP | 62-135268 U | 8/1987 |
| JP | 2000-235222 A | 8/2000 |
| JP | 2003-344926 A | 12/2003 |
| JP | 2008-209648 A | 9/2008 |
| JP | 2010-066576 A | 3/2010 |

* cited by examiner

*Primary Examiner* — Tuyen Tra
(74) *Attorney, Agent, or Firm* — McDermott Will & Emery LLP

(57) ABSTRACT

An attachment structure is configured to attach a first member to a second member. The attachment structure includes a first engagement portion which is provided at one of the first member or the second member, and a second engagement portion which is provided at the other one of the first member or the second member and which engages with the first engagement portion at a predetermined attachment position to restrict a relative movement. One of the first member or the second member at which the second engagement portion is provided, is provided with spaces at both sides of the second engagement portion in the circumferential direction. The first member and the second member include a torque change portion which changes a torque such that the torque is larger at a preceding side and a succeeding side of the attachment position in the circumferential direction, than at the attachment position.

10 Claims, 23 Drawing Sheets

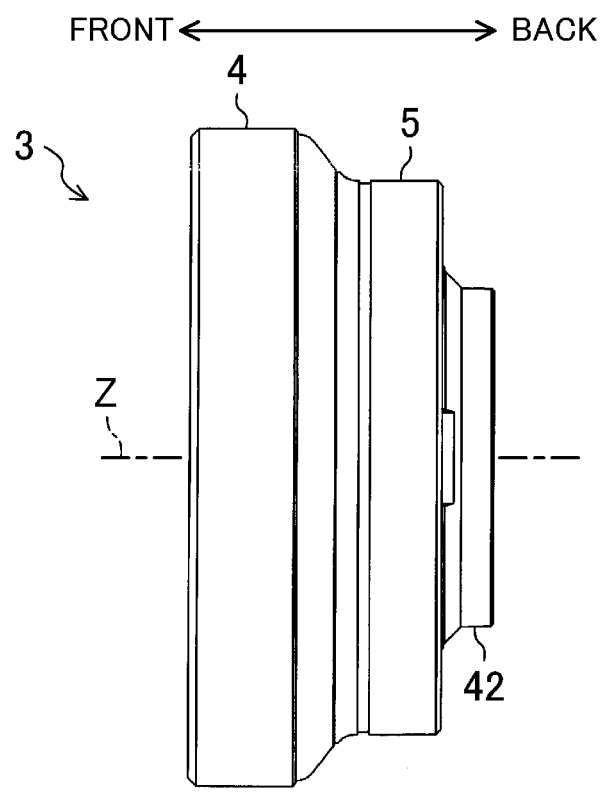
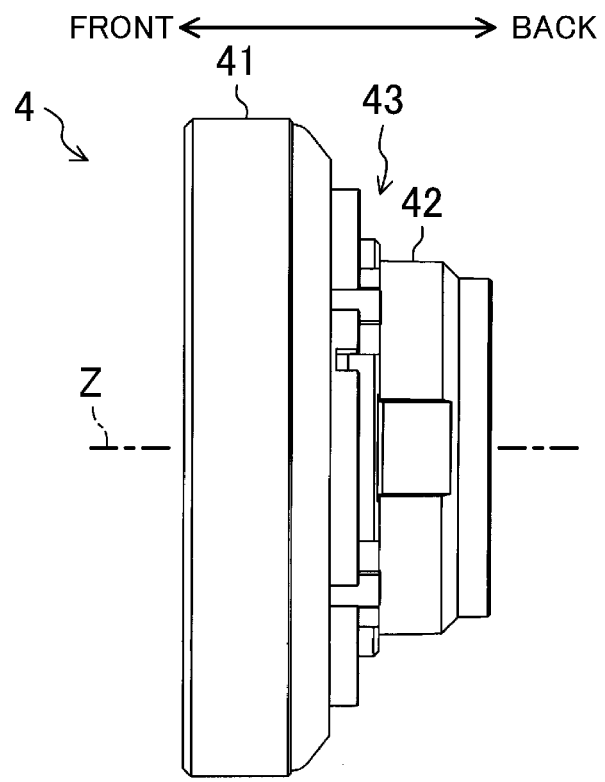

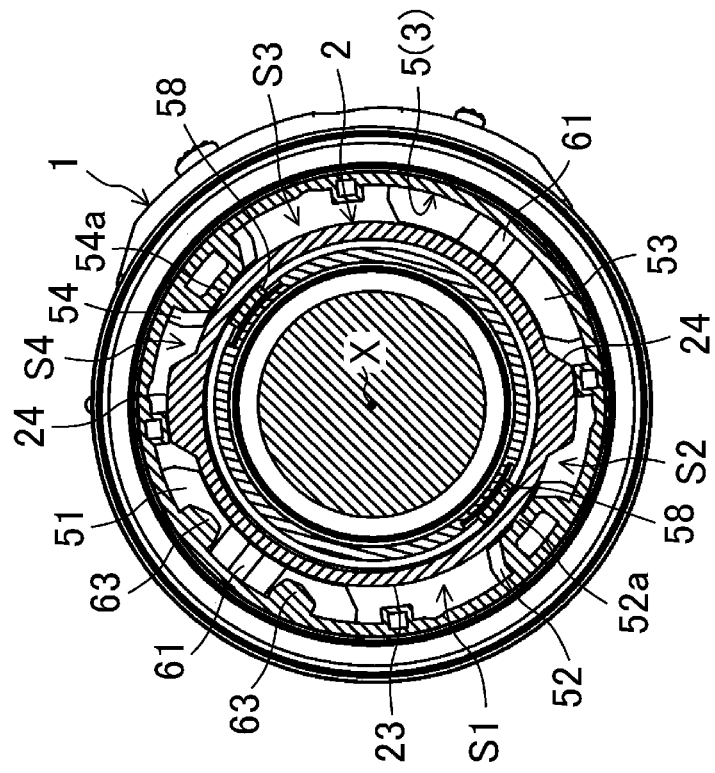
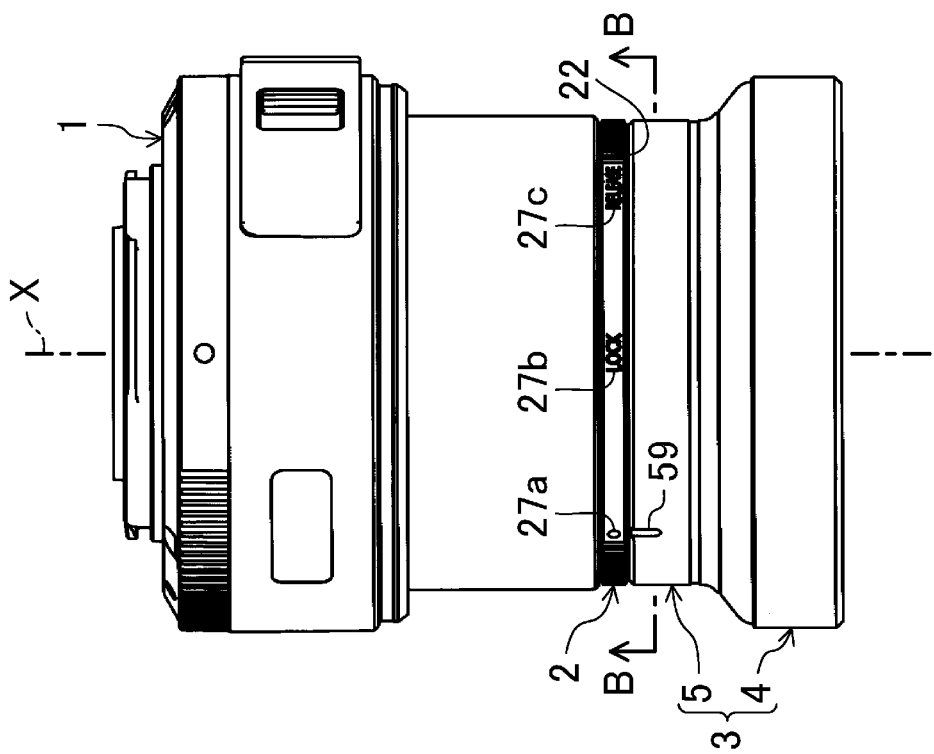
FIG.17A
FIG.17B

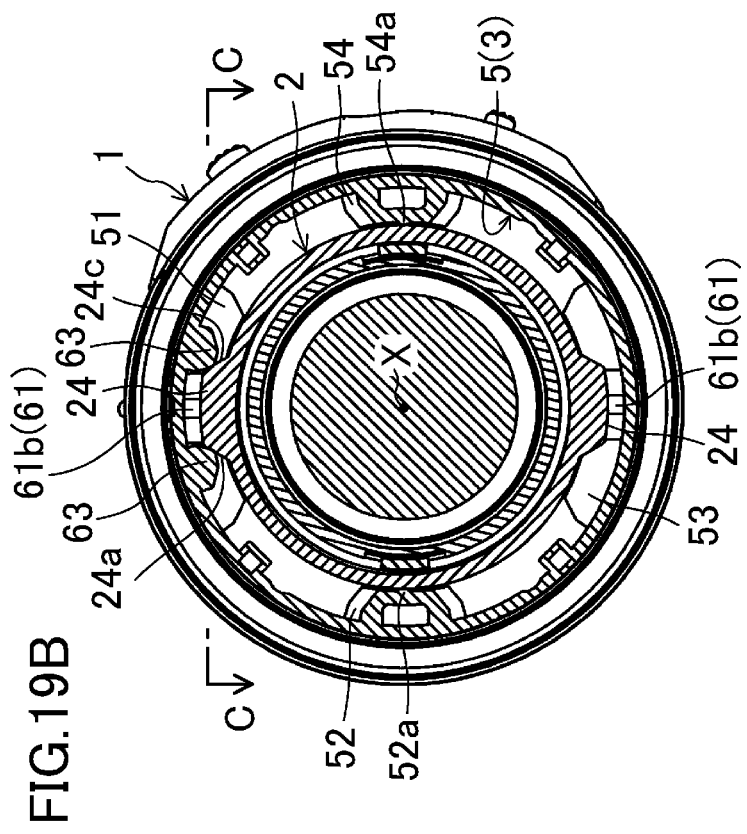
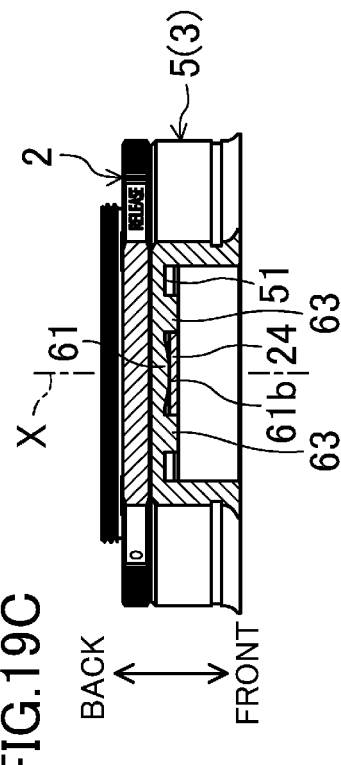
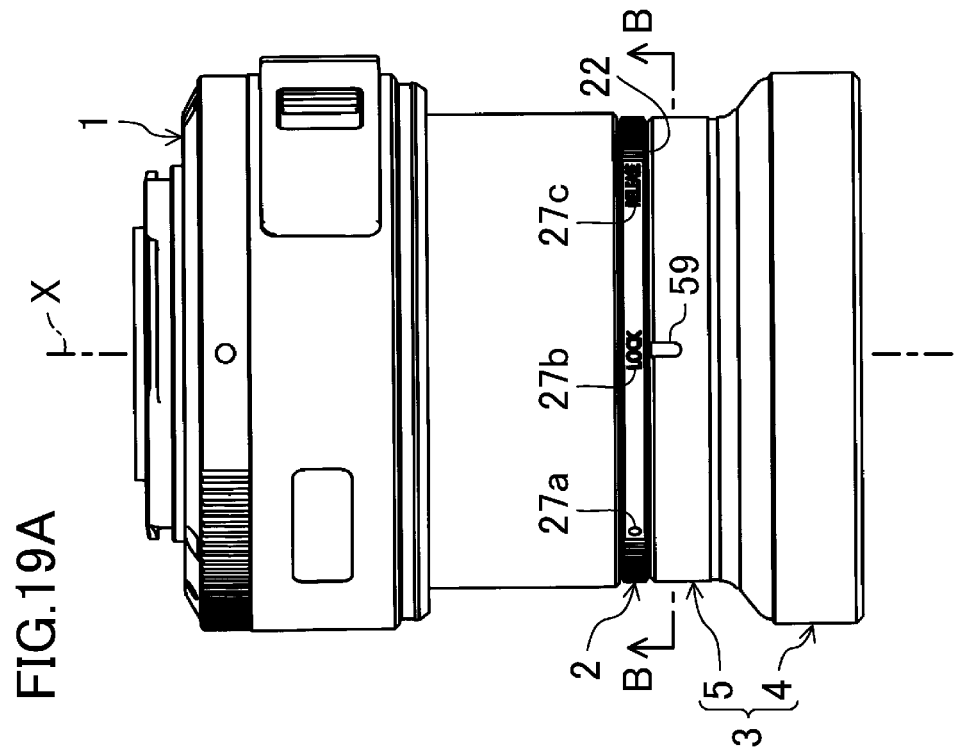
FIG.19B
FIG.19C
FIG.19A

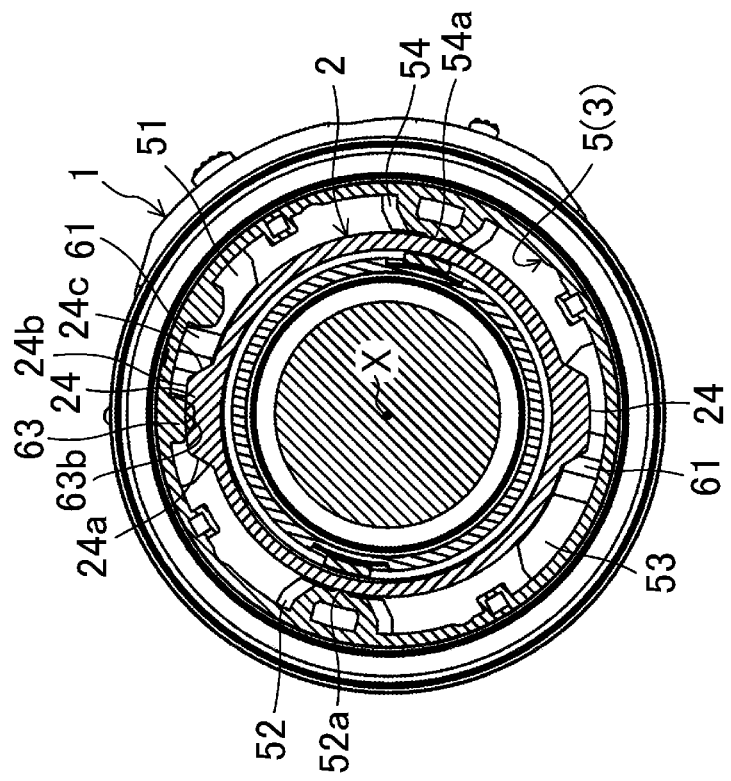
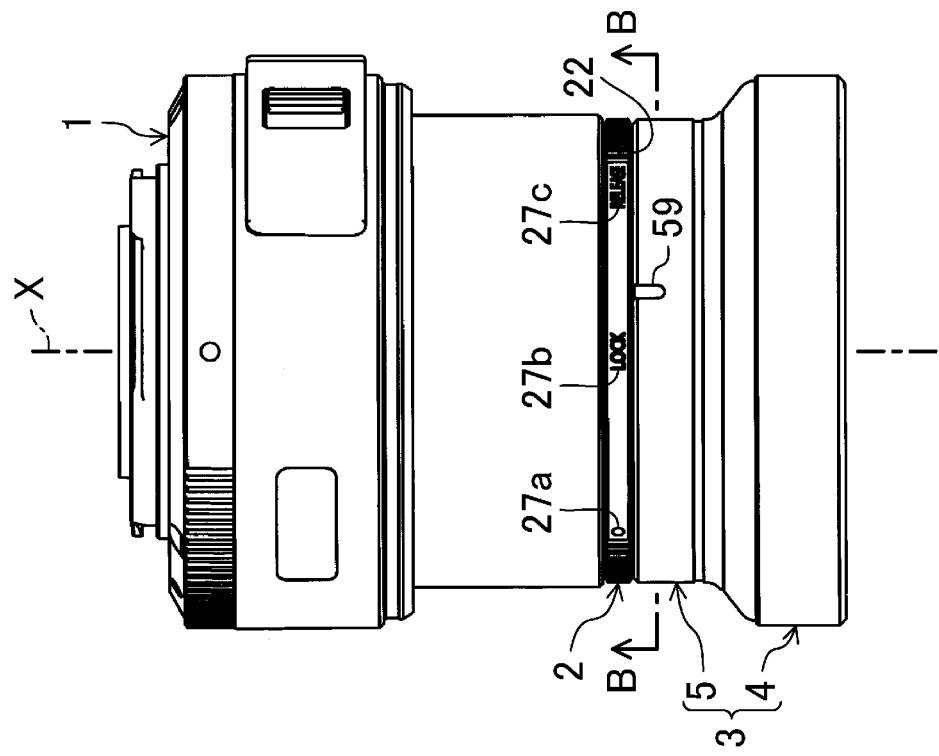

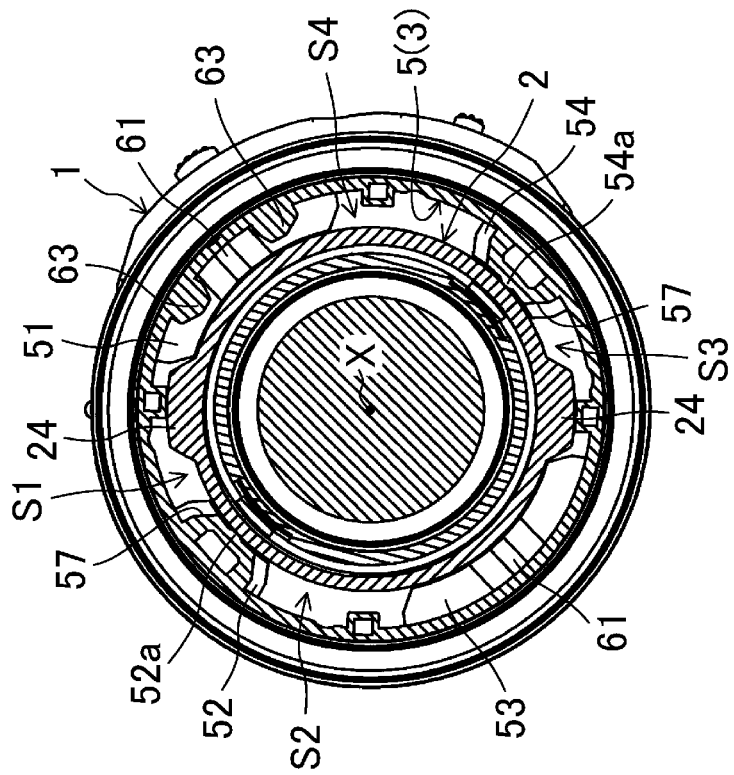

ATTACHMENT STRUCTURE AND LENS UNIT

CROSS-REFERENCE TO RELATED APPLICATION

This application claims priority to Japanese Patent Application No. 2012-085841 filed on Apr. 4, 2012, the disclosure of which including the specification, the drawings, and the claims is hereby incorporated by reference in its entirety.

BACKGROUND

The techniques disclosed herein relate to attachment structures configured to attach a first member to a second member, and lens units which include a conversion lens and an intermediate ring.

There have been various types of structures configured to attach a first member to a second member, such as a structure in which a first member is attached to a second member by relatively rotating the first member and the second member in a circumferential direction about an axis.

For example, Japanese Patent Publication No. 2000-235222 discloses a lens unit configured to attach a conversion lens as a first member to an adaptor as a second member. Specifically, an external thread is formed at a back end of the conversion lens, and an internal thread is formed at a front end of the adaptor. The conversion lens is attached to the adaptor by relatively rotating the conversion lens and the adaptor and screwing the external thread and the internal thread.

SUMMARY

However, in the structure in which the first member and the second member are attached together by threads, the threads may be damaged if the rotation torque is large. The conversion lens is expensive. Thus, the thread of the conversion lens should be prevented from being damaged. Further, the adaptor can be considered as the first member, and a lens barrel can be considered as the second member. In this case, too, the thread of the lens barrel should be prevented from being damaged because the lens barrel is expensive.

To prevent the damage, a mechanism capable of controlling the torque may be interposed between the first member and the second member. For example, a mechanism which causes slip to prevent the transmission of the rotation torque of one member to the other member when the rotation torque is equal to or larger than a predetermined value, may be interposed. However, interposing such a mechanism increases the number of parts and the cost, which results in an increase in size.

The techniques disclosed herein have been made in view of the above problems, and it is an objective of the techniques to achieve an attachment structure which is simple and is not easily damaged.

The techniques disclosed herein are intended for an attachment structure configured to attach a first member to a second member by relatively rotating the first member and the second member in a circumferential direction about a predetermined axis. This attachment structure includes a first engagement portion which is provided at one of the first member or the second member and which protrudes in a radial direction with respect to the axis as a center, and a second engagement portion which is provided at the other one of the first member or the second member and which engages with the first engagement portion at least at a predetermined attachment position in the circumferential direction to restrict a relative movement of the first member and the second member in a direction of the axis, wherein one of the first member or the second member at which the second engagement portion is provided, is provided with spaces which allow the first engagement portion to pass by the second engagement portion in the direction of the axis, at both sides of the second engagement portion in the circumferential direction, and the first member and the second member include a torque change portion which changes a torque during the relative rotation between the first member and the second member so that the torque is larger at a preceding side and a succeeding side of the attachment position in the circumferential direction, than at the attachment position.

Further, the techniques disclosed herein are intended for a lens unit having a conversion lens and an intermediate ring, which are relatively rotated in a circumferential direction about a predetermined axis to attach the conversion lens to the intermediate ring. This lens unit includes a first engagement portion which is provided at one of the conversion lens or the intermediate ring and which protrudes in a radial direction with respect to the axis as a center, and a second engagement portion which is provided at the other one of the conversion lens or the intermediate ring and which engages with the first engagement portion at least at a predetermined attachment position in the circumferential direction to restrict a relative movement of the conversion lens and the intermediate ring in a direction of the axis, wherein one of the conversion lens or the intermediate ring at which the second engagement portion is provided, is provided with spaces which allow the first engagement portion to pass by the second engagement portion in the direction of the axis, at both sides of the second engagement portion in the circumferential direction, and the conversion lens and the intermediate ring include a torque change portion which changes a torque during the relative rotation between the conversion lens and the intermediate ring so that the torque is larger at a preceding side and a succeeding side of the attachment position in the circumferential direction, than at the attachment position.

According to the above attachment structure, it is possible to achieve an attachment structure which is simple and is not easily damaged.

According to the above lens unit, it is possible to achieve an attachment structure which is simple and is not easily damaged.

BRIEF DESCRIPTION OF THE DRAWINGS

FIG. 9 is a side view of the conversion lens.

FIG. 10 is a side view of a lens frame 4.

FIG. 17A is a plan view of the lens barrel, the intermediate ring, and the conversion lens at the time when the engagement claws of the intermediate ring are brought into the conversion lens. FIG. 17B shows a cross-section taken along the line B-B of FIG. 17A.

FIG. 19A shows a plan view of the lens barrel, the intermediate ring, and the conversion lens at the time when the engagement claw is located at an attachment position.

FIG. 19B shows a cross-section taken along the line B-B of FIG. 19A. FIG. 19C shows a cross-section taken along the line C-C of FIG. 19B.

FIG. 21A shows a plan view of the lens barrel, the intermediate ring, and the conversion lens at the time when the rotation torque is the largest during detachment. FIG. 21B shows a cross-section taken along the line B-B of FIG. 21A.

FIG. 22A shows a plan view of the lens barrel, the intermediate ring, and the conversion lens immediately before the engagement claws of the intermediate ring are removed from the conversion lens. FIG. 22B shows a cross-section taken along the line B-B of FIG. 22A.

DETAILED DESCRIPTION

An embodiment will be described in detail below based on the drawings.

Embodiment

Figure 1:
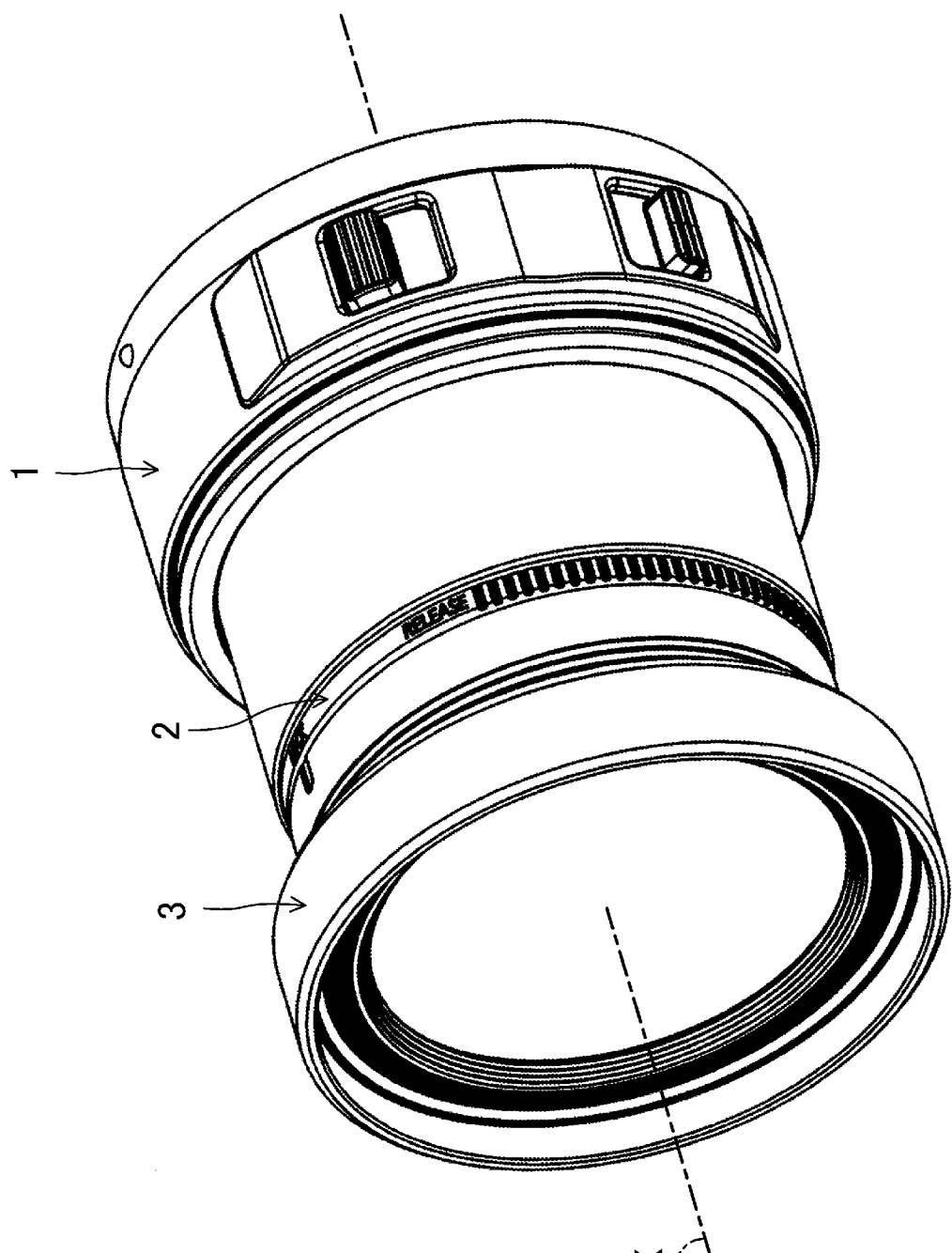
FIG. 1 is an oblique view of a lens barrel and a conversion lens.

FIG. 1 is an oblique view of a lens barrel 1 and a conversion lens 3 to which an attachment structure according to an embodiment is applied.

[1. Lens Barrel]

The conversion lens 3 is attached to the lens barrel 1, with an intermediate ring 2 interposed therebetween. The intermediate ring 2 is attached to a front end portion of the lens barrel 1. The conversion lens 3 is attached to the intermediate ring 2. The conversion lens 3 according to the present embodiment is a front conversion lens which is attached to the front end of the lens barrel 1. In addition, the conversion lens 3 is a wide conversion lens which enables wider angle shooting. The conversion lens 3 is an example first member and an example optical component. The intermediate ring 2 is an example second member. The intermediate ring 2 and the conversion lens 3 are an example lens unit.

In the present specification, the side closer to the object of shooting is referred to as "front" side, and the side closer to the camera body is referred to as "back" side for convenience of explanation. Further, unless otherwise explained, the term "radial direction" refers to a radial direction about a predetermined axis (i.e., axes W-Z described later), and the term "circumferential direction" refers to a circumferential direction about a predetermined axis.

Figure 2:
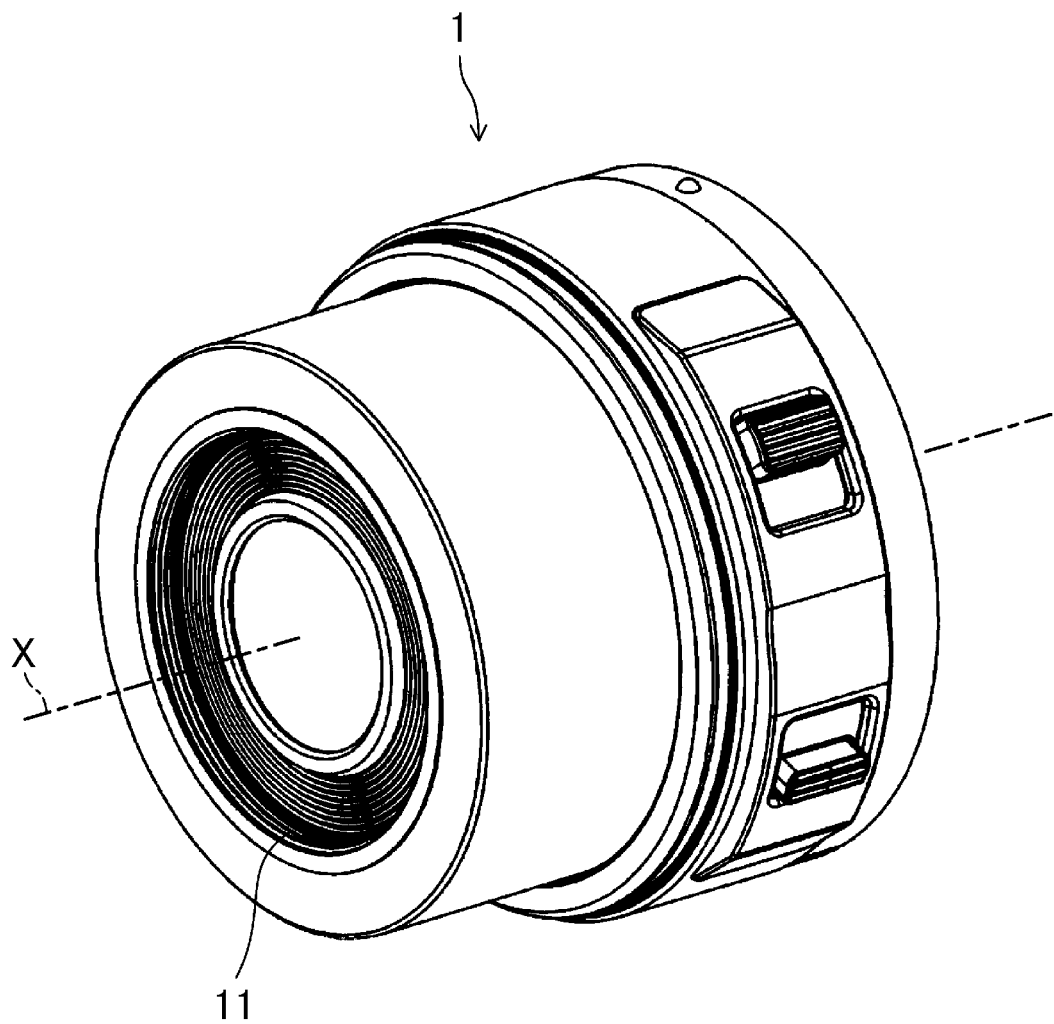
FIG. 2 is an oblique view of the lens barrel.

FIG. 2 is an oblique view of the lens barrel 1. The lens barrel 1 is an interchangeable lens which is attachable to the camera body. The lens barrel 1 has an optical axis X. A general-purpose filter thread (an internal thread) 11 is formed in the front end portion of the lens barrel 1. The filter thread 11 is a so-called a right-hand thread. Thus, the external thread goes deeper when the external thread is rotated clockwise. The lens barrel 1 is not limited to the interchangeable lens, but may be a lens barrel attached to the camera body so as not to be capable of being detached from the camera body.

[2. Intermediate Ring]

Figure 3:
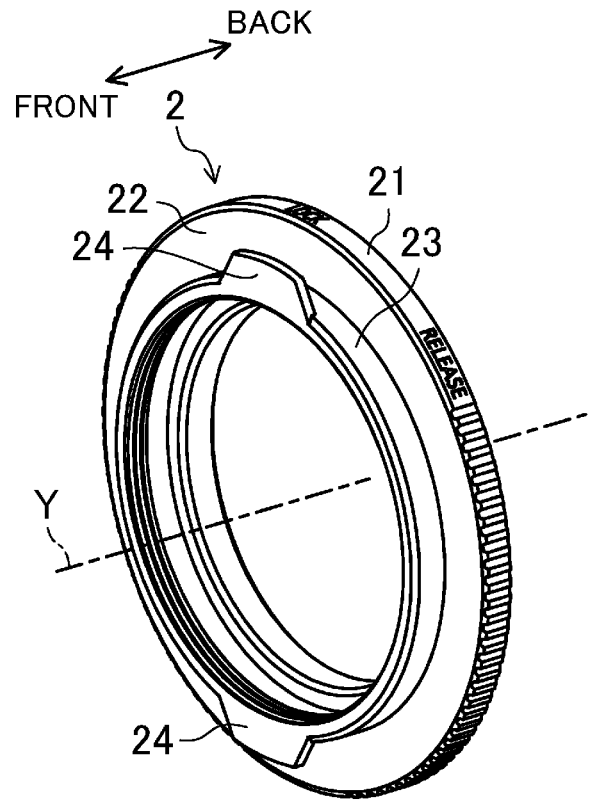
FIG. 3 is an oblique view of an intermediate ring.
Figure 4:
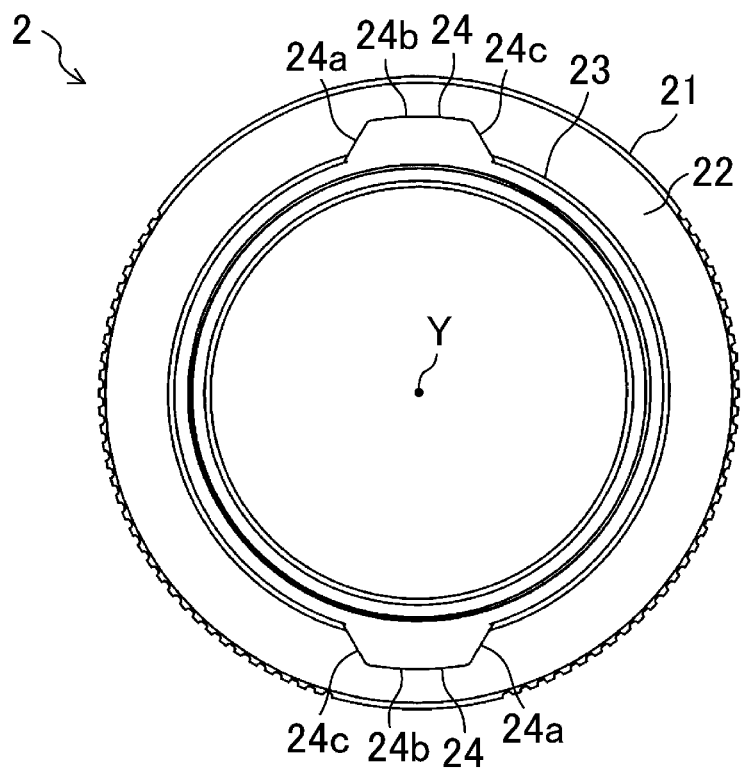
FIG. 4 is a front view of the intermediate ring.
Figure 5:
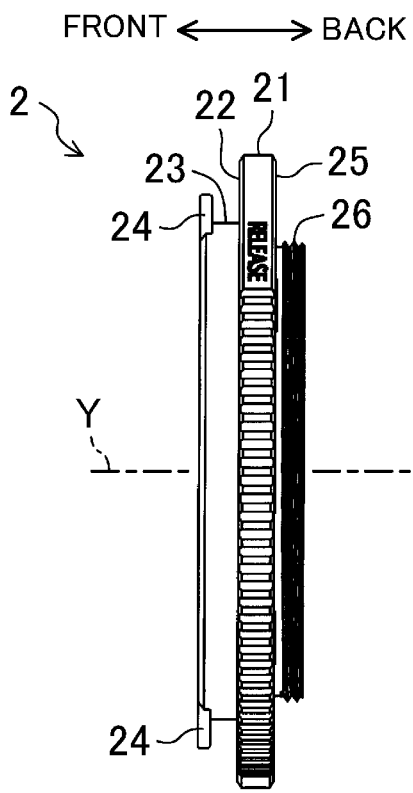
FIG. 5 is a side view of the intermediate ring.
Figure 6:
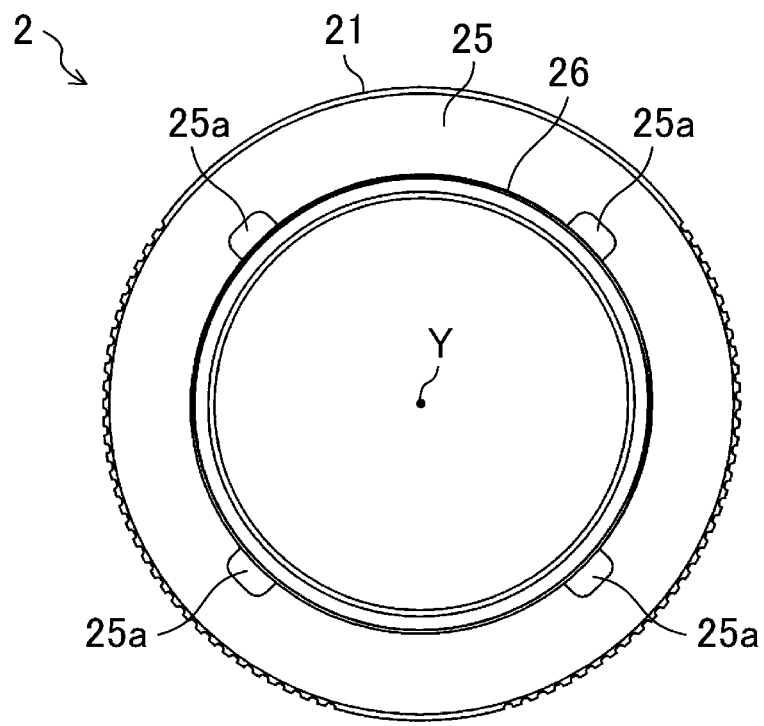
FIG. 6 is a back view of the intermediate ring.
Figure 7:
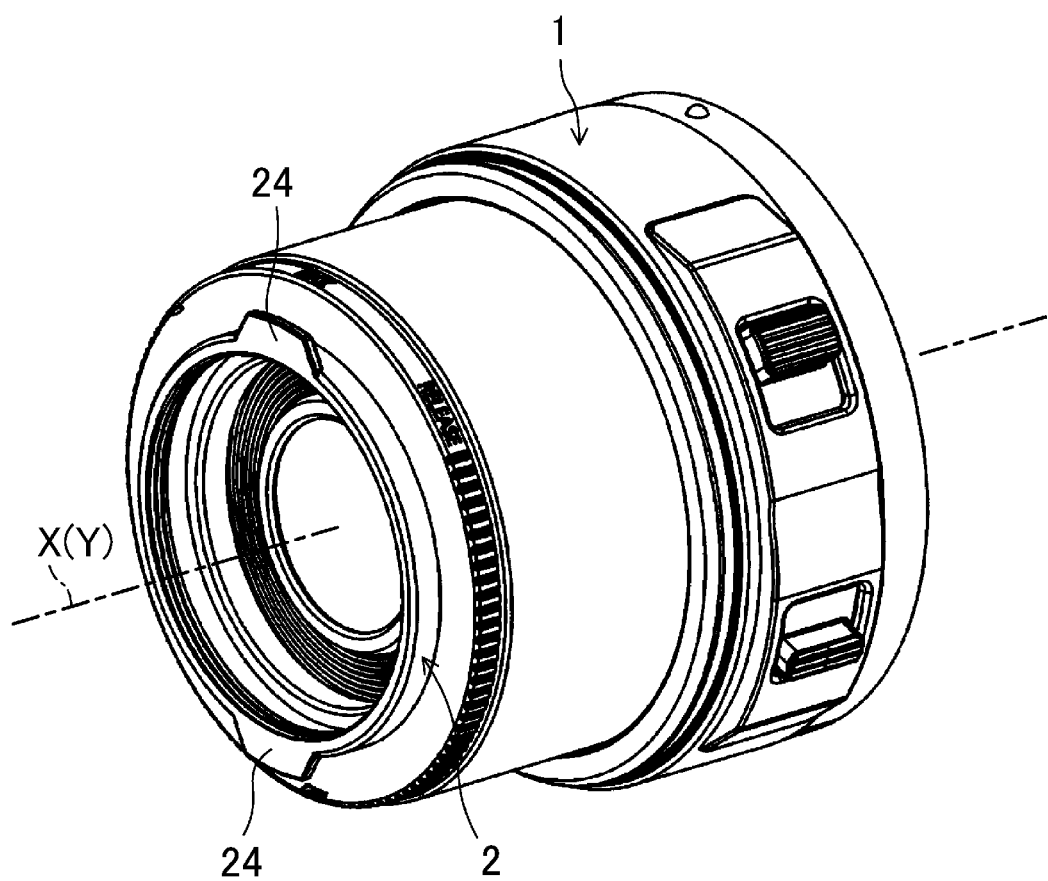
FIG. 7 is an oblique view of the lens barrel to which the intermediate ring is attached.

FIG. 3 is an oblique view of the intermediate ring 2. FIG. 4 is a front view of the intermediate ring 2. FIG. 5 is a side view of the intermediate ring 2. FIG. 6 is a back view of the intermediate ring 2. FIG. 7 is an oblique view of the lens barrel 1 to which the intermediate ring 2 is attached. The intermediate ring 2 is made of resin, and is a member having an annular ring shape as shown in FIG. 3. Specifically, the intermediate ring 2 includes a cylindrical body 21, a front wall 22 provided at the front end of the body 21, a cylindrical portion 23 which protrudes forward from the front wall 22, two engagement claws 24 provided at the cylindrical portion 23, a back wall 25 (see FIGS. 5 and 6) provided at the back end of the body 21, and an external thread 26 (see FIGS. 5 and 6) which protrudes backward from the back wall 25.

As shown in FIGS. 3 and 4, the front wall 22 is a wall having an annular ring shape, and is orthogonal to the central axis Y of the body 21. As shown in FIGS. 3 and 5, the cylindrical portion 23 is a cylinder whose central axis coincides with the central axis Y, and extends forward from an inner circumferential edge of the front wall 22. As shown in FIGS. 3-5, the engagement claws 24 are provided to protrude radially outward from the front end edge of the cylindrical portion 23. The two engagement claws 24 are positioned at locations opposed to each other with the central axis Y interposed therebetween, that is, locations shifted from each other by 180° in the circumferential direction.

As shown in FIG. 6, the back wall 25 is a wall having an annular ring shape, and is orthogonal to the central axis Y. The back wall 25 is provided with four contact portions 25a which come in contact with the front end surface of the lens barrel 1. The four contact portions 25a are positioned at 90° intervals in the circumferential direction. The external thread 26 is screwed into the filter thread 11 of the lens barrel 1. The external thread 26 is an example attachment portion.

The intermediate ring 2 is attached to the front end of the lens barrel 1 as shown in FIG. 7, by screwing the external thread 26 into the filter thread 11. Here, the contact portions 25a of the intermediate ring 2 come in contact with the front end surface of the lens barrel 1, and the optical axis X of the lens barrel 1 and the central axis Y of the intermediate ring 2 are aligned. In the state in which the intermediate ring 2 is attached to the lens barrel 1, the engagement claws 24 are located at the forefront.

More details of the configuration of the engagement claws 24 will be described. As shown in FIG. 5, each of the engagement claws 24 is a plate-like member having an approximately uniform thickness (i.e., a dimension in the central axis direction). As shown in FIG. 4, each of the engagement claws 24 has an approximately trapezoidal shape which includes two inclined end surfaces 24a, 24c extending outward from the cylindrical portion 23, and a tip end surface 24b connecting the tips of the two inclined end surfaces 24a, 24c. Each of the inclined end surfaces 24a, 24c is inclined with respect to the radial direction such that the circumferential dimension of the engagement claw 24 is decreased in a radially outward direction. The tip end surface 24b extends along the circumference of a circle having the same axis as the axis of the body 21. The engagement claws 24 are an example first engagement portion.

[3. Conversion Lens]

Figure 8:
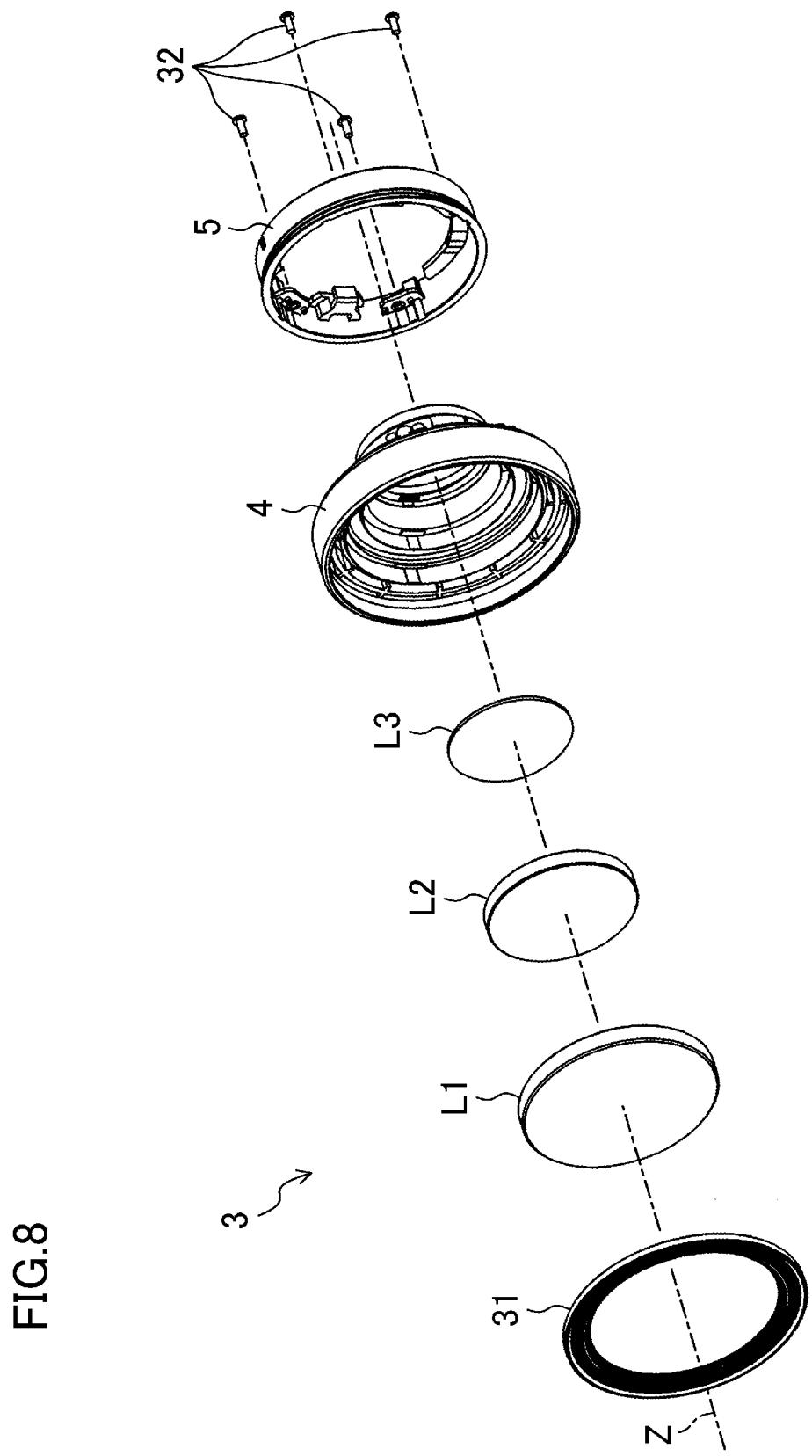
FIG. 8 is an exploded oblique view of the conversion lens.

FIG. 8 is an exploded oblique view of the conversion lens 3. FIG. 9 is a side view of the conversion lens 3. As shown in FIG. 8, the conversion lens 3 includes a lens frame 4, first to third lenses L1-L3 held on the lens frame 4, a decorative ring 31 attached to the lens frame 4, and a back frame 5 attached to the lens frame 4 by screws 32. The first to third lenses L1-L3 are arranged sequentially from the front side, and coaxially with the optical axis Z, and are provided inside the lens frame 4. The decorative ring 31 is attached to the front end portion of the lens frame 4. As shown in FIG. 9, the back frame 5 is attached to the lens frame 4 from the back side. The conversion lens 3 is attached to the intermediate ring 2 via the back frame 5.

[3-1. Lens Frame]

Figure 11:
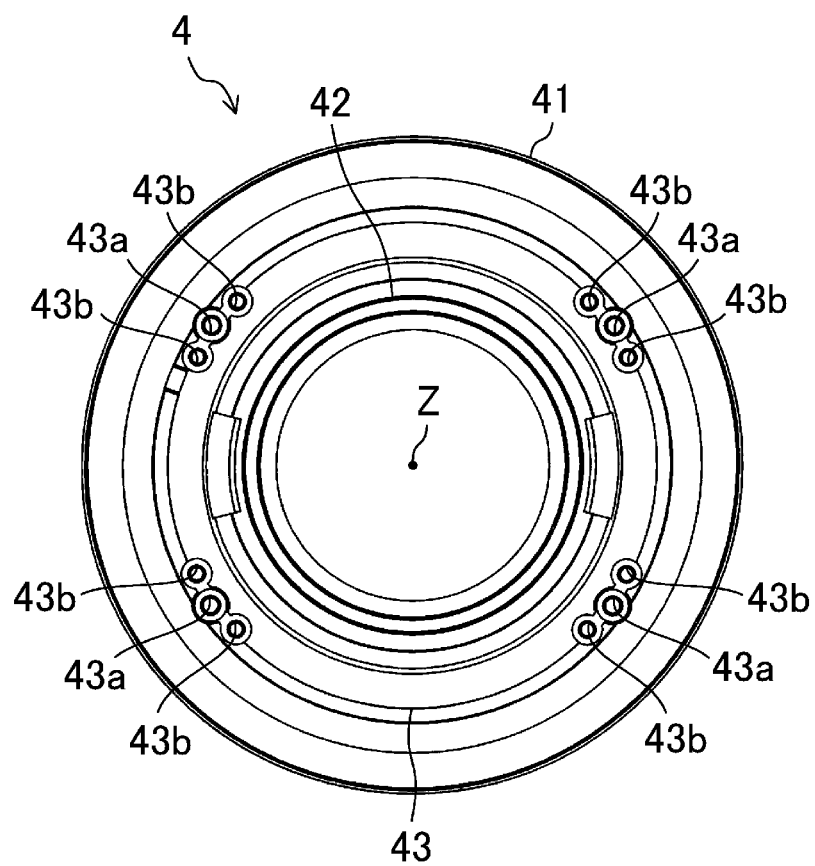
FIG. 11 is a back view of the lens frame 4.

FIG. 10 is a side view of the lens frame 4. FIG. 11 is a back view of the lens frame 4. As shown in FIG. 10, the lens frame 4 includes a cylindrical large-diameter portion 41 having a relatively large outer diameter, a cylindrical small-diameter portion 42 having a relatively small outer diameter, and a step portion 43 located between the large-diameter portion 41 and the small-diameter portion 42. The large-diameter portion 41, the small-diameter portion 42, and the step portion 43 are coaxially arranged. As shown in FIG. 11, the step portion 43 is provided with four screw holes 43a which are open toward the back side. The four screw holes 43a are provided at intervals in the circumferential direction. Positioning holes 43b which are open toward the back side are provided at both sides of each of the screw holes 43a in the circumferential direction. The positioning holes 43b have a circular cross-section.

[3-2. Back Frame]

Figure 12:
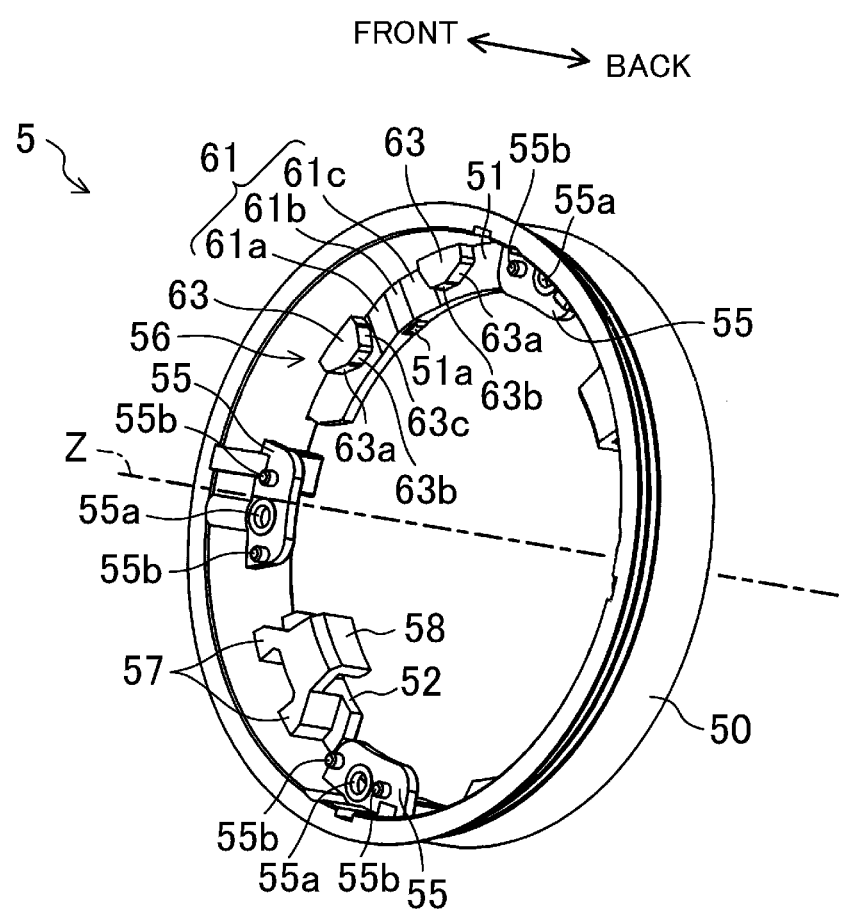
FIG. 12 is a back frame viewed from an oblique angle from the front.
Figure 13:
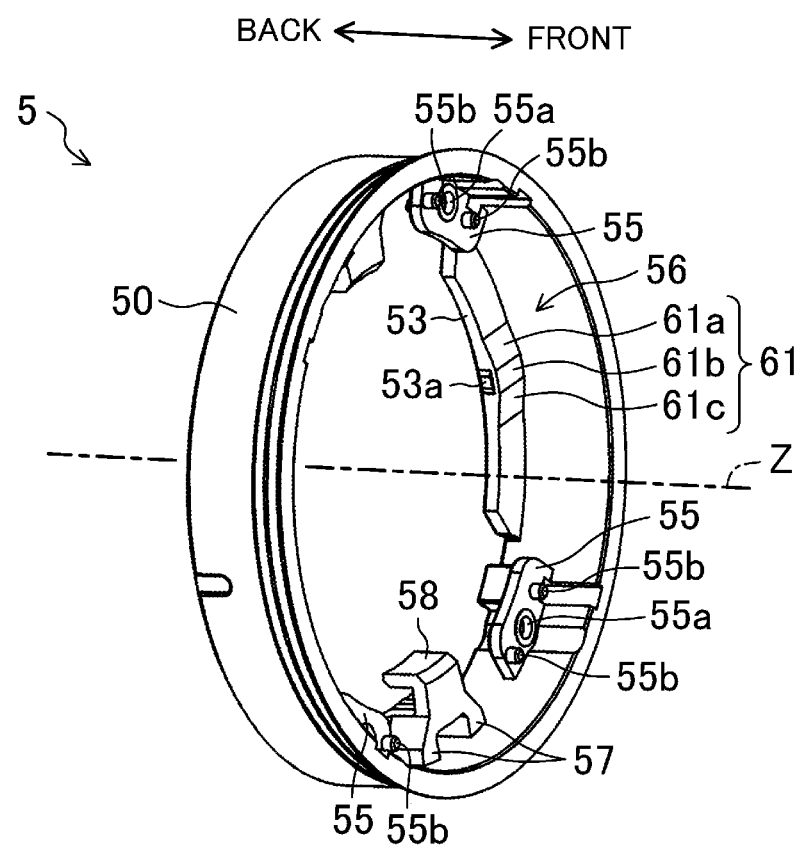
FIG. 13 is the back frame viewed from a different oblique angle from the front.
Figure 14:
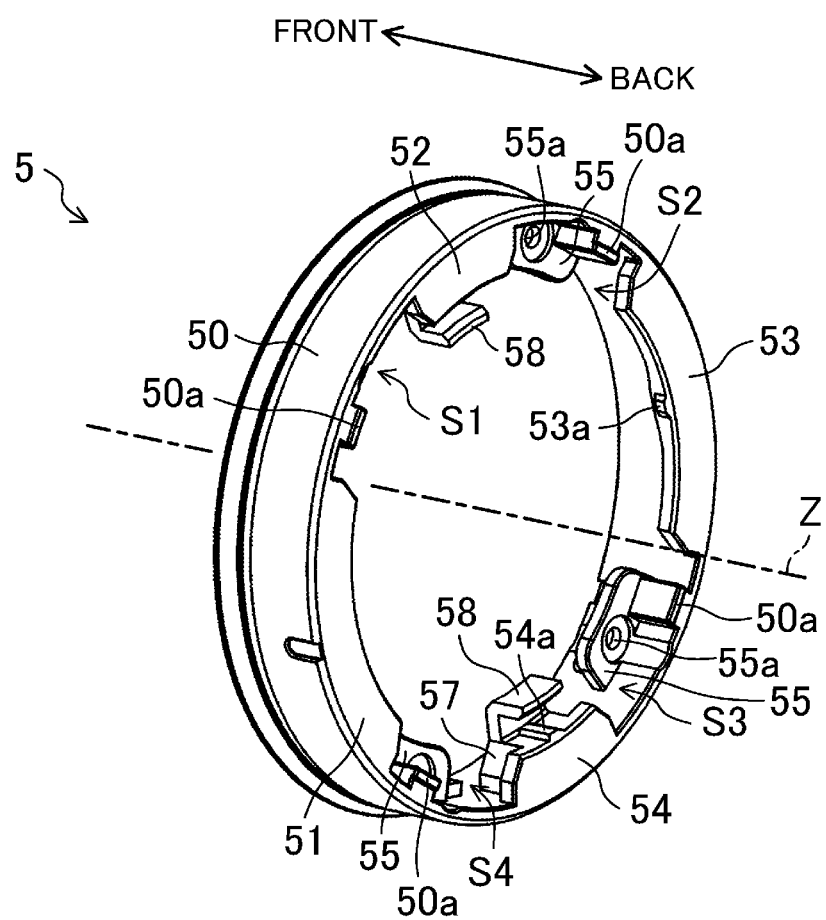
FIG. 14 is the back frame viewed from an oblique angle from the back.
Figure 15:
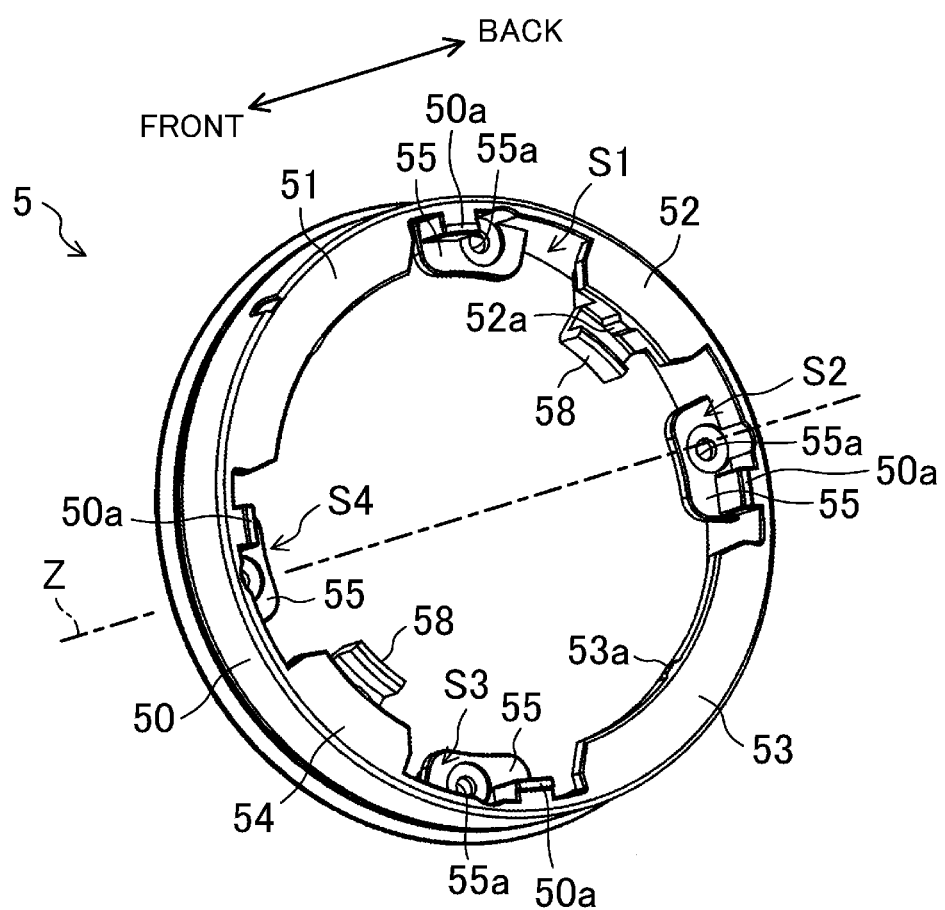
FIG. 15 is the back frame viewed from a different oblique angle from the back.

FIG. 12 is the back frame 5 viewed from an oblique angle from the front. FIG. 13 is the back frame 5 viewed from a different oblique angle from the front. FIG. 14 is the back frame 5 viewed from an oblique angle from the back. FIG. 15 is the back frame 5 viewed from a different oblique angle from the back. The back frame 5 is a cylindrical member made of resin. Specifically, the back frame 5 includes: a cylindrical body 50; first to fourth engagement walls 51-54 provided at the back end edge of the body 50; attachment walls 55 for attaching the back frame 5 to the lens frame 4; an engagement portion 56 which engages with the intermediate ring 2 to determine the relative positioning of the conversion lens 3 and the intermediate ring 2 in the optical axis direction and the circumferential direction; a stopper 57 which restricts relative rotation of the conversion lens 3 with respect to the intermediate ring 2; a guide 58 which determines the positional relationship between the conversion lens 3 and the intermediate ring 2 when attaching the conversion lens 3 to the intermediate ring 2; and contact portions 50a which come in contact with the intermediate ring 2 in the optical axis direction when the conversion lens 3 is attached to the intermediate ring 2. The inner diameter of the body 50 is larger than the diameter of a circle in contact with the tip end surfaces 24b of the two engagement claws 24 of the intermediate ring 2.

[3-2-1. Attachment Walls]

The attachment walls 55 are provided at four locations on the inner circumferential surface of the body 50 at intervals in the circumferential direction. The attachment walls 55 are provided approximately in the middle of the body 50 in the optical axis direction. The attachment walls 55 are walls orthogonal to the optical axis Z, and protrude radially inward from the inner circumferential surface of the body 50. Each of the attachment walls 55 is provided with an insertion hole 55a which passes through the attachment wall 55 and through which the screw 32 is inserted. As shown in FIGS. 12 and 13, positioning pins 55b which protrude forward are provided at both sides of each of the insertion holes 55a in the circumferential direction. The positions of the four insertion holes 55a correspond to the positions of the four screw holes 43a of the lens frame 4. In addition, the positions of the four pairs of the positioning pins 55b correspond to the positions of the four pairs of the positioning holes 43b of the lens frame 4. That is, in attaching the back frame 5 to the lens frame 4, the attachment walls 55 are made to come in contact with the step portion 43 such that the four pairs of the positioning pins 55b fit into the four pairs of the positioning holes 43b. After that, the screws 32 inserted in the insertion holes 55a of the attachment walls 55 are screwed into the screw holes 43a, thereby screw-fastening the attachment walls 55 to the step portion 43. As a result, the back frame 5 is attached to the lens frame 4.

Each of the attachment walls 55 has the contact portion 50a. That is, the contact portions 50a are provided at four locations. The contact portions 50a protrude backward more than the first to fourth engagement walls 51-54, and are hindmost parts of the back frame 5.

[3-2-2. Engagement Wall]

Each of the first to fourth engagement walls 51-54 is a wall orthogonal to the optical axis and having an arc shape with respect to the optical axis as a center. The first to fourth engagement walls 51-54 protrude from the inner circumferential surface of the body 50 radially inward. The first engagement wall 51 and the third engagement wall 53 are positioned at locations opposed to each other with the optical axis interposed therebetween, that is, locations shifted from each other by 180° in the circumferential direction. Further, the second engagement wall 52 and the fourth engagement wall 54 are positioned at locations opposed to each other with the optical axis interposed therebetween, that is, locations shifted from each other by 180° in the circumferential direction. The second engagement wall 52 is positioned at a middle portion between the first engagement wall 51 and the third engagement wall 53 in the circumferential direction. The fourth engagement wall 54 is positioned at a middle portion between the third engagement wall 53 and the first engagement wall 51 in the circumferential direction. The dimensions of the first and third engagement walls 51, 53 in the circumferential direction are larger than the dimensions of the second and fourth engagement walls 52, 54. Each of the first and third engagement walls 51, 53 is an example second engagement portion. Each of the second and fourth engagement walls 52, 54 is an example third engagement portion.

The first to fourth engagement walls 51-54 respectively have, at a middle of the circumferential direction, protrusions 51a-54a which protrude radially inward. The ends of the protrusions 51a-54a are located on one circle whose center coincides with the optical axis Z. The diameter of the circle is approximately the same as, or slightly larger than, the outer diameter of the cylindrical portion 23 of the intermediate ring 2.

As shown in FIGS. 14 and 15, a first space S1 is provided between the first engagement wall 51 and the second engagement wall 52, a second space S2 is provided between the second engagement wall 52 and the third engagement wall 53, a third space S3 is provided between the third engagement wall 53 and the fourth engagement wall 54, and a fourth space S4 is provided between the fourth engagement wall 54 and the first engagement wall 51, in the circumferential direction. The first to fourth spaces S1-S4 are wide enough for the respective engagement claws 24 of the intermediate ring 2 to pass in the optical axis direction. The attachment walls 55 are positioned at locations different from the locations where the first to fourth engagement walls 51-54 are provided in the circumferential direction.

[3-2-3. Engagement Portion]

The engagement portion 56 includes a slope 61 which restricts a relative displacement of the conversion lens 3 in the optical axis direction with respect to the intermediate ring 2, and projecting portions 63 which change the rotation torque during the attachment of conversion lens 3 to the intermediate ring 2 and which restrict a relative displacement of the conversion lens 3 in the circumferential direction with respect to the intermediate ring 2.

[3-2-3-1. Slope]

As shown in FIGS. 12 and 13, the slope 61 is provided to each of the first and third engagement walls 51, 53. The configuration of the slope 61 of the first engagement wall 51 and the configuration of the slope 61 of the third engagement wall 53 are similar to each other. Thus, only the slope 61 of the first engagement wall 51 will be described below.

As will be described in detail later, the slope 61 is a portion on which the engagement claw 24 of the intermediate ring 2 rides, in attaching the conversion lens 3 to the intermediate ring 2. The slope 61 is provided on the front surface of the first engagement wall 51, and is raised forward from the front surface. The slope 61 includes a first slope portion 61a, a flat portion 61b, and a second slope portion 61c. The flat portion 61b is closer to the front side than the front surface of the first engagement wall 51 in the optical axis direction, and is orthogonal to the optical axis Z. The flat portion 61b is in a middle of the first engagement wall 51 in the circumferential direction. That is, on the first engagement wall 51, the location of the flat portion 61b in the circumferential direction and the location of the protrusion 51a in the circumferential direction are approximately the same. The first slope portion 61a is inclined with respect to the optical axis Z, from end edge of the flat portion 61b in the circumferential direction to the front surface of the first engagement wall 51. The second slope portion 61c is inclined with respect to the optical axis Z, from the other edge of the flat portion 61b in the circumferential direction to the front surface of the first engagement wall 51.

[3-2-3-2. Projecting Portion]

As shown in FIG. 12, the projecting portions 63 are provided on the first engagement wall 51. As will be described in detail later, the projecting portions 63 are portions which come in contact with the engagement claw 24 of the intermediate ring 2 in attaching the conversion lens 3 to the intermediate ring 2. A pair of projecting portions 63 are provided on the first engagement wall 51. The pair of projecting portions 63 are located on the front surface of the first engagement wall 51 at both sides of the slope 61 in the circumferential direction. Each of the projecting portions 63 protrudes from the inner circumferential surface of the body 50 radially inward. Each of the projecting portions 63 includes at least three edge surfaces which are approximately orthogonal to the front surface of the first engagement wall 51. Specifically, each projecting portion 63 includes a tip end surface 63b, and two inclined end surfaces 63a, 63c which extend from both edges of the tip end surface 63b. The tip end surface 63b extends approximately along the circumferential direction. The tip end surfaces 63b of the two projecting portions 63 are in contact with one circle whose center coincides with the optical axis Z. The diameter of this circle is smaller than the diameter of the circle in contact with the tip end surfaces 24b of the two the engagement claws 24 of the intermediate ring 2. The two inclined end surfaces 63a, 63c are inclined with respect to the radial direction such that the dimensions of the projecting portions 63 in the circumferential direction are gradually reduced radially inward. Of the two inclined end surfaces 63a, 63c, the inclined end surface 63c closer to the slope 61 has an angle inclined with respect to the radial direction which is smaller than the inclined angle of the inclined end surface 63a farther from the slope 61. Hereinafter, the inclined end surface 63a is referred to as an "outer inclined end surface 63a" and the inclined end surface 63c is referred to as an "inner inclined end surfaces 63c." The shapes of the two projecting portions 63 are symmetric with respect to a straight line which passes through the slope 61 and extends in the radial direction. The engagement claw 24 and the pair of projecting portions 63 form a torque change portion, which changes the rotation torque in attaching the conversion lens 3 to the intermediate ring 2 so that the rotation torque is larger at a preceding side and a succeeding side of an attachment position (described later) in the circumferential direction, and is smaller than the larger rotation torque at the attachment position. Further, the engagement claw 24 and the projecting portions 63 form a torque increase portion which increases the rotation torque in attaching the conversion lens 3 to the intermediate ring 2.

[3-2-4. Stopper]

As shown in FIGS. 12 and 14, the stoppers 57 are provided on the second and fourth engagement walls 52, 54. The configuration of the stopper 57 on the second engagement wall 52 and the configuration of the stopper 57 on the fourth engagement wall 54 are the same. Thus, only the stopper 57 on the second engagement wall 52 will be described below.

Specifically, the stopper 57 provided on the front surface of the second engagement wall 52 includes two stoppers 57. The two stoppers 57 are located inwardly from the both edges of the second engagement wall 52 in the circumferential direction. That is, the second engagement wall 52 projects from the stoppers 57 in the circumferential direction. The stopper 57 and the engagement claw 24 form a rotation stopper. The engagement claw 24 of the intermediate ring 2 comes in contact with the stopper 57, the details of which will be described later.

The two stoppers 57 are integrally formed with the guide 58. The guide 58 extends radially inward from the stoppers 57, and then is bent to extend backward in the optical axis direction. The end of the guide 58 which extends in the optical axis direction is curved along the circumferential direction. The end of the guide 58 faces the protrusion 52a of the second engagement wall 52, with a space therebetween.

[3-2-5. Back Configuration of Conversion Lens]

Figure 16:
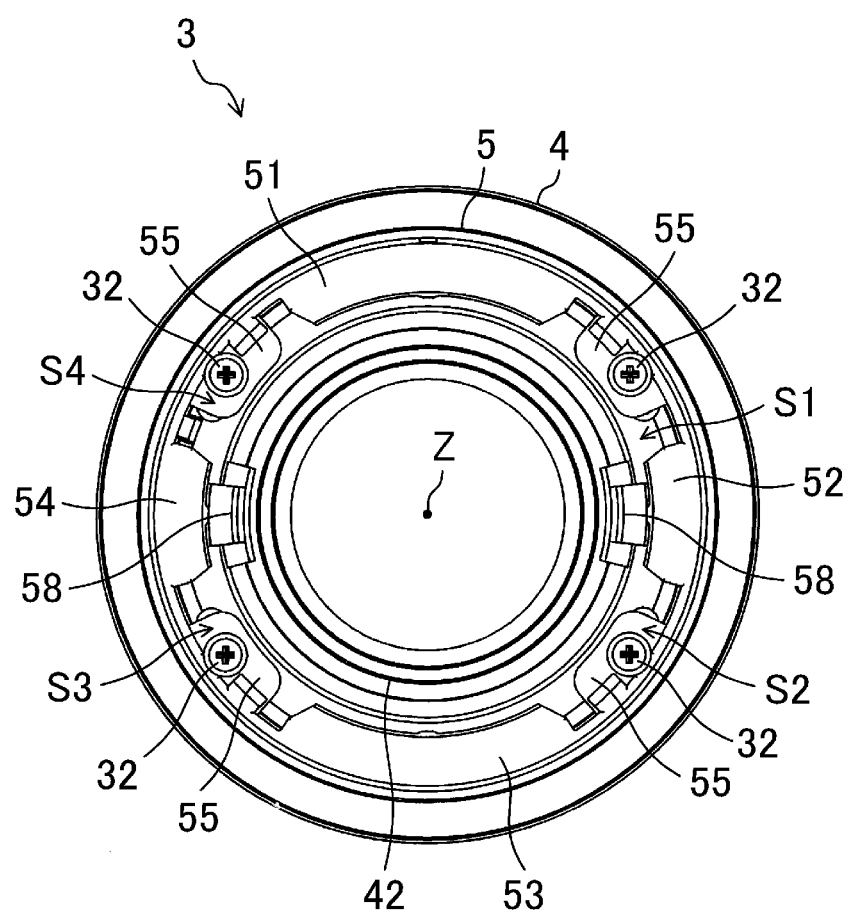
FIG. 16 is a back view of the conversion lens.

FIG. 16 is a back view of the conversion lens 3. In the state where the back frame 5 having the above-described configuration is attached to the lens frame 4, the first to fourth engagement walls 51-54 are located at the back of the conversion lens 3. The first to fourth spaces S1-S4 are respectively formed between the first and second, the second and third, the third and the fourth, and the fourth and first engagement walls 51-54, in the circumferential direction. The attachment walls 55 are located on the front sides of the respective first to fourth spaces S1-S4. Thus, in spite of the configuration in which the first to fourth engagement walls 51-54 are located on the back side of the attachment walls 55, the attachment walls 55 can be accessed from the back side in an attachment process such as inserting the screws 32 in the insertion holes 55*a*, and fastening the screws 32 in the screw holes 43*a*. Further, the small-diameter portion 42 of the lens frame 4 is located at a radially inner position than the positions of the two guides 58 of the back frame 5, and as shown in FIG. 9, the small-diameter portion 42 protrudes backward from the back frame 5.

[4. Attachment and Detachment of Conversion Lens]

The attachment and detachment of the conversion lens 3 to and from the lens barrel 1 will be described below. In the following descriptions, the attachment and detachment in moving the intermediate ring 2 or the conversion lens 3 with respect to the lens barrel 1 will be described. However, these movements are relative movements. Thus, the lens barrel 1 may be moved with respect to the intermediate ring 2 or the conversion lens 3, or both of the lens barrel 1 and the intermediate ring 2 or the conversion lens 3 can be moved.

[4-1. Attachment of Intermediate Ring]

First, the intermediate ring 2 is attached to the lens barrel 1. Specifically, the external thread 26 of the intermediate ring 2 is screwed in the filter thread 11 of the lens barrel 1. The filter thread 11 and the external thread 26 are right-hand threads. Thus, when viewed facing back in the optical axis direction (i.e., when viewed from the intermediate ring 2 to the lens barrel 1), the intermediate ring 2 is screwed clockwise. In the state in which the intermediate ring 2 is attached to the lens barrel 1, the engagement claws 24 of the intermediate ring 2 are located at the forefront as shown in FIG. 7.

[4-2. Attachment of Conversion Lens]

Figure 18B:
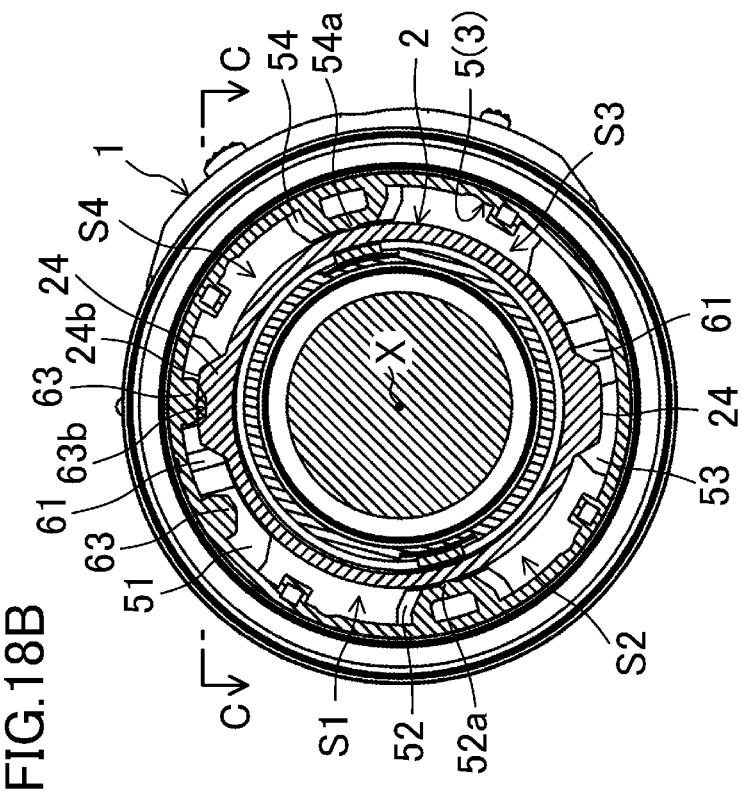
FIG. 18B shows a cross-section taken along the line B-B of FIG. 18A.
Figure 18C:
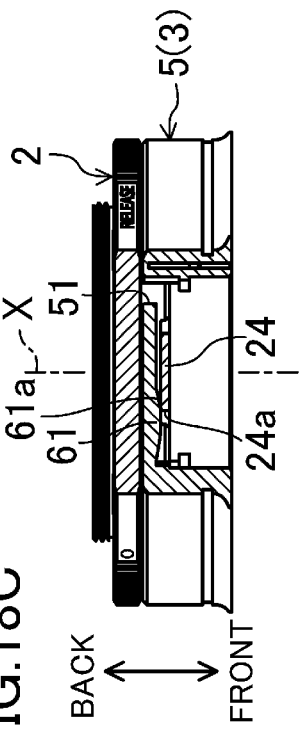
FIG. 18C shows a cross-section taken along the line C-C of FIG. 18B.
Figure 18A:
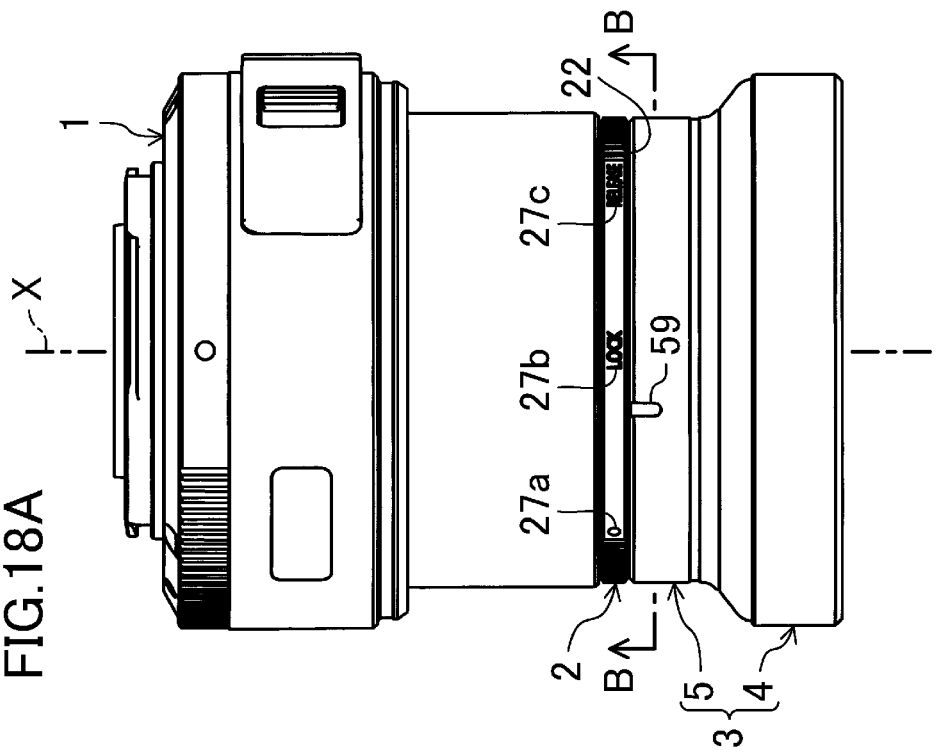
FIG. 18A shows a plan view of the lens barrel, the intermediate ring, and the conversion lens at the time when the rotation torque is the largest during the attachment.
Figure 20:
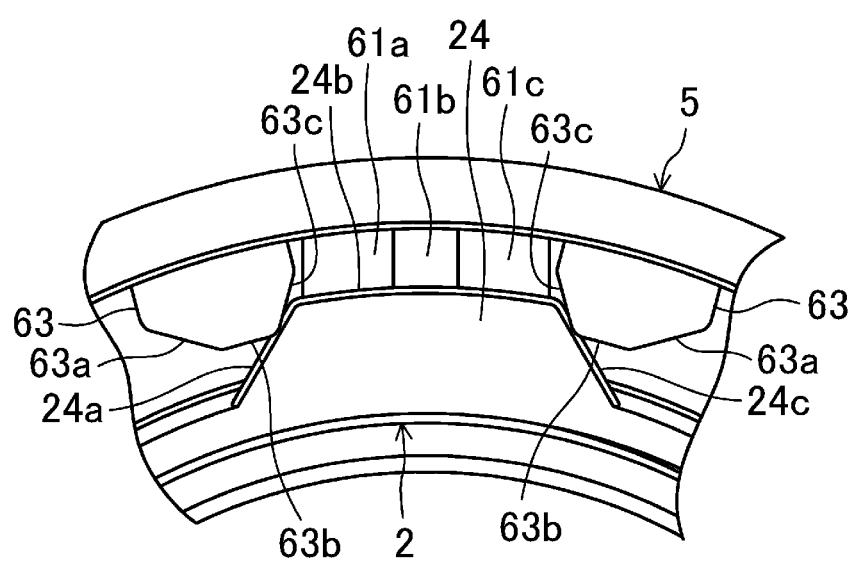
FIG. 20 is an enlarged view of one of the engagement claws and the projecting portions in the state in which the engagement claw is located at the attachment position.

Next, the conversion lens 3 is attached to the intermediate ring 2 attached to the lens barrel 1. FIGS. 17-22 show the states in respective steps of attaching the conversion lens 3 to the intermediate ring 2. FIG. 17 shows the state in which the engagement claws of the intermediate ring are inserted in the conversion lens. FIG. 18 shows the state in which the rotation torque is the largest during the attachment. FIG. 19 shows the state in which the engagement claws are located at the attachment positions. FIG. 21 shows the state in which the rotation torque is the largest during the detachment. FIG. 22 shows the state immediately before the engagement claws of the intermediate ring are removed from the conversion lens. FIGS. 18C and 19C show only the intermediate ring 2 and the back frame 5. FIG. 20 is an enlarged view of one of the engagement claws 24 and the projecting portions 63 in the state in which the engagement claw is located at the attachment position.

First, as shown in FIG. 17, the positions of the first to fourth spaces S1-S4 of the back frame 5 and the positions of the engagement claws 24 of the intermediate ring 2 are aligned in the circumferential direction to insert the engagement claws 24 in the first to fourth spaces S1-S4.

The two engagement claws 24 are positioned at locations shifted from each other by 180°, and each of the first to fourth spaces S1-S4 has a corresponding one of the spaces at a location shifted by 180°. Thus, if the position of one of the engagement claws 24 in the circumferential direction is aligned with any one of the positions of the first to fourth spaces S1-S4 in the circumferential direction, the position of the other engagement claw 24 is also aligned with the position of another one of the first to fourth spaces S1-S4 in the circumferential direction.

In the present description, the two engagement claws 24 are aligned with the second and fourth spaces S2, S4. As shown in FIG. 17A, the back frame 5 is provided with a mark 59 on its outer circumferential surface. Further, the intermediate ring 2 is provided on its outer circumferential surface, with marks 27*a*-27*c* indicating an insertion position, a lock position, and a release position, respectively. For example, it is possible to align the two engagement claws 24 with the second and fourth spaces S2, S4, respectively, by aligning the mark 59 of the back frame 5 with the mark 27*a* of the intermediate ring 2.

The first to fourth spaces S1-S4 are wide enough for the engagement claws 24 to pass in the optical axis direction as described above. Thus, when the conversion lens 3 is brought close to the intermediate ring 2, the engagement claws 24 pass through the second and fourth spaces S2, S4 in the optical axis direction. That is, the engagement claws 24 pass by the first to fourth engagement walls 51-54 in the optical axis direction to be inserted in the back frame 5 of the conversion lens 3.

The conversion lens 3 is moved in the optical axis direction until the back end of the conversion lens 3, specifically the contact portions 50*a*, comes in contact with the front wall 22 of the intermediate ring 2. In the state in which the back end of the conversion lens 3 is in contact with the front wall 22, the conversion lens 3 is positioned on the front side of the intermediate ring 2, whereas the first to fourth engagement walls 51-54 are positioned on the back side of the engagement claws 24. That is, the anterior-posterior relationship of the conversion lens 3 and the intermediate ring 2 is opposite to the anterior-posterior relationship of the first to fourth engagement walls 51-54 and the engagement claws 24. The engagement claws 24 are not in contact with any member at this time.

When the engagement claws 24 are brought into the back frame 5, the cylindrical portion 23 is inserted in a space between the protrusion 52*a* of the second engagement wall 52*a* and the guide 58, and a space between the protrusion 54*a* of the fourth engagement wall 54 and the guide 58. The provision of the guide 58 can prevent the optical axis Z of the conversion lens 3 from being significantly tilted with respect to the central axis Y of the intermediate ring 2 when the engagement claws 24 are brought into the back frame 5.

Further, when the engagement claws 24 are brought into the back frame 5, the protrusions 51*a*-54*a* of the back frame 5 come in contact with the outer circumferential surface of the cylindrical portion 23 of the intermediate ring 2. Thus, the optical axis Z of the conversion lens 3 aligns with the central axis Y of the intermediate ring 2, which leads to alignment with the optical axis X of the lens barrel 1.

Next, the conversion lens 3 is relatively rotated with respect to the intermediate ring 2 about the optical axis X so that the first and third engagement walls 51, 53 are moved to in front of the two engagement claws 24.

Specifically, since the two engagement claws 24 are aligned with the second and fourth spaces S2, S4 as described above, the conversion lens 3 is rotated clockwise when viewed facing back in the optical axis direction. Since the contact between the protrusions 51*a*-54*a* of the back frame 5 and the cylindrical portion 23 of the intermediate ring 2 is maintained at this time, the conversion lens 3 is rotated about the optical axis X, with the optical axis Z being aligned with the optical axis X of the lens barrel 1.

In the case where the two engagement claws 24 are aligned with the first and third spaces S1, S3, the conversion lens 3 is rotated counterclockwise when viewed facing back in the optical axis direction.

As a result, the first and third engagement walls 51, 53 start to overlap with the two engagement claws 24 in an anterior-posterior direction. Here, the term "overlap in the anterior-posterior direction" means that a plurality of members are aligned in the anterior-posterior direction. If the contact portions 50a of the conversion lens 3 are in contact with the front wall 22 of the intermediate ring 2 at this time, the first and third engagement walls 51, 53 do not come in contact with the engagement claws 24. That is, there is a space between each of the first and third engagement walls 51, 53 and the corresponding one of the two engagement claws 24 in the anterior-posterior direction. In other words, in this state, the conversion lens 3 and the intermediate ring 2 can relatively move in the optical axis direction in this space.

As the relative rotation between the conversion lens 3 and the intermediate ring 2 goes on, one of the projecting portions 63 of the first engagement wall 51 comes in contact with one of the engagement claws 24. Specifically, the outer inclined end surface 63a of the projecting portion 63 comes in contact with a ridge portion formed by the inclined end surface 24a and the tip end surface 24b of the engagement claw 24. The rotation torque of the relative rotation between the conversion lens 3 and the intermediate ring 2 starts to increase from the time when the projecting portion 63 and the engagement claw 24 come in contact with each other.

As the relative rotation between the conversion lens 3 and the intermediate ring 2 further goes on from this state, part of the back frame 5 adjacent to the projecting portion 63 deforms and expands outward because the protrusion 53a of the back frame 5 is in contact with the cylindrical portion 23 of the intermediate ring 2. Additionally, the contact position of the outer inclined end surface 63a with the ridge portion of the engagement claw 24 moves toward the tip end surface 63b. The rotation torque gradually increases during this period.

Then, as shown in FIG. 18, the tip end surface 63b of the projecting portion 63 comes in contact with the tip end surface 24b of the engagement claw 24. Since FIG. 18 omits showing the deformation of the back frame 5, the engagement claw 24 and the projecting portion 63 overlap each other in the drawing. The rotation torque is approximately the largest rotation torque in the state where the tip end surface 63b of the projecting portion 63 and the tip end surface 24b of the engagement claw 24 are in contact with each other.

When the tip end surface 24b of the engagement claw 24 and the tip end surface 63b of the projecting portion 63 start to come in contact with each other, the slope 61 starts to come in contact with a ridge portion formed by the back surface of the engagement claw 24 and the inclined end surface 24a, as shown in FIG. 18C. Specifically, the first slope portion 61a of the slope 61 comes in contact with the ridge portion. The positions of the conversion lens 3, the intermediate ring 2, and the optical axis direction are restricted by the contact between the slope 61 and the engagement claw 24. Then, the flat portion 61b of the slope 61 and the back surface of the engagement claw 24 are brought into contact with each other. When the flat portion 61b of the slope 61 and the engagement claw 24 are brought into contact to each other, that is, engaged with each other, forward movement of the conversion lens 3 with respect to the intermediate ring 2 is restricted. In this state, the contact portions 50a of the back frame 5 are in contact with the front wall 22 of the intermediate ring 2. Thus, backward movement of the conversion lens 3 with respect to the intermediate ring 2 is restricted. Accordingly, movement of the conversion lens 3 with respect to the intermediate ring 2 in the optical axis direction is restricted.

The slope 61 is provided not only on the first engagement wall 51, but also on the third engagement wall 53. Thus, the slope 61 is engaged with the engagement claw 24 at the third engagement wall 53, as well.

As the relative rotation between the conversion lens 3 and the intermediate ring 2 goes on, the tip end surface 63b of the projecting portion 63 passes by the tip end surface 24b of the engagement claw 24, and the projecting portion 63 comes in contact with the inclined end surface 24c of the engagement claw 24. The deformation of the back frame 5 starts to be removed at this time. At the same time, the rotation torque starts to decrease.

When the conversion lens 3 is rotated to the position at which the mark 59 meets the mark 27b as shown in FIG. 19A, the other projecting portion 63 comes in contact with the inclined end surface 24a of the engagement claw 24 as shown in FIG. 19B. Accordingly, one of the projecting portions 63 is in contact with the inclined end surface 24a of the engagement claw 24, and the other projecting portion 63 is in contact with the inclined end surface 24c of the engagement claw 24. The attachment of the conversion lens 3 to the intermediate ring 2 is completed at this point. This position is the attachment position. As shown in FIG. 19C, at the attachment position, the state continues in which the engagement claw 24 and the flat portion 61b of the slope 61 are in contact with each other and in which the contact portions 50a of the back frame 5 and the front wall 22 of the intermediate ring 2 are in contact with each other, thereby restricting the movement of the conversion lens 3 with respect to the intermediate ring 2 in the axis direction.

As shown in FIG. 20, at the attachment position, the ridge portion formed by the tip end surface 63b and the inner inclined end surface 63c of one of the projecting portions 63 is in contact with the inclined end surface 24c of the engagement claw 24, and the ridge portion formed by tip end surface 63b and the inner inclined end surface 63c of the other projecting portion 63 is in contact with the inclined end surface 24a of the engagement claw 24. As a result, movement of the conversion lens 3 with respect to the intermediate ring 2 in the circumferential direction is restricted.

[4-3. Detachment of Conversion Lens]

Next, in detaching the conversion lens 3 from the intermediate ring 2, the conversion lens 3 is relatively rotated with respect to the intermediate ring 2 about the optical axis X from the attachment position. The fourth and first spaces S4, S1 are formed on sides of the first engagement wall 51 in the circumferential direction, and the spaces S2, S3 are formed on sides of the third engagement wall 53 in the circumferential direction. Thus, the conversion lens 3 can be detached by relatively rotating the conversion lens 3 with respect to the intermediate ring 2 in either circumferential direction. In the following description, the case in which the conversion lens 3 is detached by rotating the conversion lens 3 clockwise when viewed facing back in the optical axis direction, will be described.

When the conversion lens 3 is relatively rotated clockwise as mentioned above, the projecting portion 63 located at a preceding side of the rotation moves away from the engagement claw 24, and the projecting portion 63 located at a succeeding side of the rotation relatively slides on the inclined end surface 24a of the engagement claw 24 toward the tip end surface 24b. Part of the back frame 5 adjacent to the projecting portion 63 on the succeeding side of the rotation deforms and expands outward at this time. Thus, the rotation torque gradually increases.

As a result, as shown in FIG. 21, the tip end surface 63b of the projecting portion 63 and the tip end surface 24b of the engagement claw 24 come in contact with each other. Since FIG. 21 omits showing the deformation of the back frame 5, the engagement claw 24 and the projecting portion 63 overlap each other in the drawing. The rotation torque is approximately the largest rotation torque in the state where the tip end surface 63b of the projecting portion 63 and the tip end surface 24b of the engagement claw 24 are in contact with each other.

As the relative rotation between the conversion lens 3 and the intermediate ring 2 goes on, the projecting portion 63 comes in contact with the ridge portion formed by the tip end surface 24b and the inclined end surface 24c of the engagement claw 24. The deformation of the back frame 5 starts to be removed at this time. At the same time, the rotation torque starts to decrease.

As the relative rotation between the conversion lens 3 and the intermediate ring 2 goes on, the projecting portion 63 on the succeeding side of the rotation, too, moves away from the engagement claw 24. The rotation torque is the smallest at this point.

As the relative rotation between the conversion lens 3 and the intermediate ring 2 goes on, as shown in FIG. 22, the two engagement claws 24 do not align with the first and third engagement walls 51, 53 in the anterior-posterior direction, and are located in the first and third spaces S1, S3 in the circumferential direction.

After that, the conversion lens 3 and the intermediate ring 2 are moved away from each other in the optical axis direction, and thereby the two engagement claws 24 pass through the first and third spaces S1, S3 and pass by the first and third engagement walls 51, 53. As a result, the conversion lens 3 is detached from the intermediate ring 2.

Here, in detaching the conversion lens 3 from the intermediate ring 2 by rotating the conversion lens 3 counterclockwise when viewed facing back in the optical axis direction, the two engagement claws 24 pass through the second and fourth spaces S2, S4.

[4-4. Detachment of Intermediate Ring]

Lastly, the intermediate ring 2 is detached from the lens barrel 1. Specifically, the intermediate ring 2 is rotated clockwise when viewed facing back in the optical axis direction.

The intermediate ring 2 can be detached from the lens barrel 1 by utilizing the conversion lens 3. Specifically, when the conversion lens 3 is detached from the intermediate ring 2, the conversion lens 3 is rotated counterclockwise when viewed facing back in the optical axis direction. As the relative rotation of the conversion lens 3 goes on, the first and third engagement walls 51, 53 and the two engagement claws 24 are disengaged and the second and fourth spaces S2, S4 are aligned with the two engagement claws 24 in the anterior-posterior direction. In the above description, the conversion lens 3 is detached from the intermediate ring 2 by pulling the conversion lens 3 out in the optical axis direction in this state. To detach the intermediate ring 2 from the lens barrel 1, however, the relative rotation of the conversion lens 3 is continued. Then, the stopper 57 of the conversion lens 3 comes in contact with the engagement claw 24. If the relative rotation of the conversion lens 3 is further continued even after the contact of the stopper 57 with the engagement claws 24, the rotation torque of the conversion lens 3 is transmitted to the intermediate ring 2 through the stopper 57 and the engagement claw 24, thereby making it possible to rotate the intermediate ring 2. The counterclockwise rotational direction when viewed facing the lens barrel 1 is a rotational direction in which the intermediate ring 2 is detached from the lens barrel 1. Therefore, by continuing the relative rotation of the conversion lens 3, it is possible to rotate the intermediate ring 2 and detach the intermediate ring 2 from the lens barrel 1. It is difficult to hold the intermediate ring 2 and apply a force to the intermediate ring 2 since the intermediate ring 2 is a relatively thin member. In contrast, the conversion lens 3 is a member whose dimension in the optical axis direction is relatively large. Thus, it is easy to hold the conversion lens 3 and apply a force to the conversion lens 3. The conversion lens 3 is used to detach the intermediate ring 2 from the lens barrel 1 for this reason, which makes it possible to easily detach the intermediate ring 2 from the lens barrel 1.

The intermediate ring 2 is held on the conversion lens 3 when the intermediate ring 2 is finally detached. Specifically, in the state in which the two engagement claws 24 are in contact with the stoppers 57, the second and fourth engagement walls 52, 54 are aligned with the two engagement claws 24 in the anterior-posterior direction. Thus, the second and fourth engagement walls 52, 54 are engaged with the two engagement claws 24 even after the intermediate ring 2 is detached from the lens barrel 1, and therefore, the intermediate ring 2 does not drop from the conversion lens 3. Since the intermediate ring 2 is held on the conversion lens 3 as described, it is possible to prevent the drop of the intermediate ring 2 immediately after the detachment of the intermediate ring 2 from the lens barrel 1, and the intermediate ring 2 can be easily handled.

[5. Lens Cap]

In the above description, the intermediate ring 2 is detached from the lens barrel 1 in the detachment process, but the intermediate ring 2 may remain attached to the lens barrel 1. The intermediate ring 2 functions as an adaptor. Thus, any optical member can be attached to the lens barrel 1 through the intermediate ring 2 as long as the optical member is applicable to the engagement claws 24. Thus, even if the conversion lens 3 is detached, it is more convenient if the intermediate ring 2 remains attached to the lens barrel 1. Further, the shape and the size of the intermediate ring 2 do not affect the optical system of the lens barrel 1 in the state in which the intermediate ring 2 is attached to the lens barrel 1. Therefore, it is possible to shoot images in the usual manner even if the intermediate ring 2 is attached to the lens barrel 1.

Figure 23:
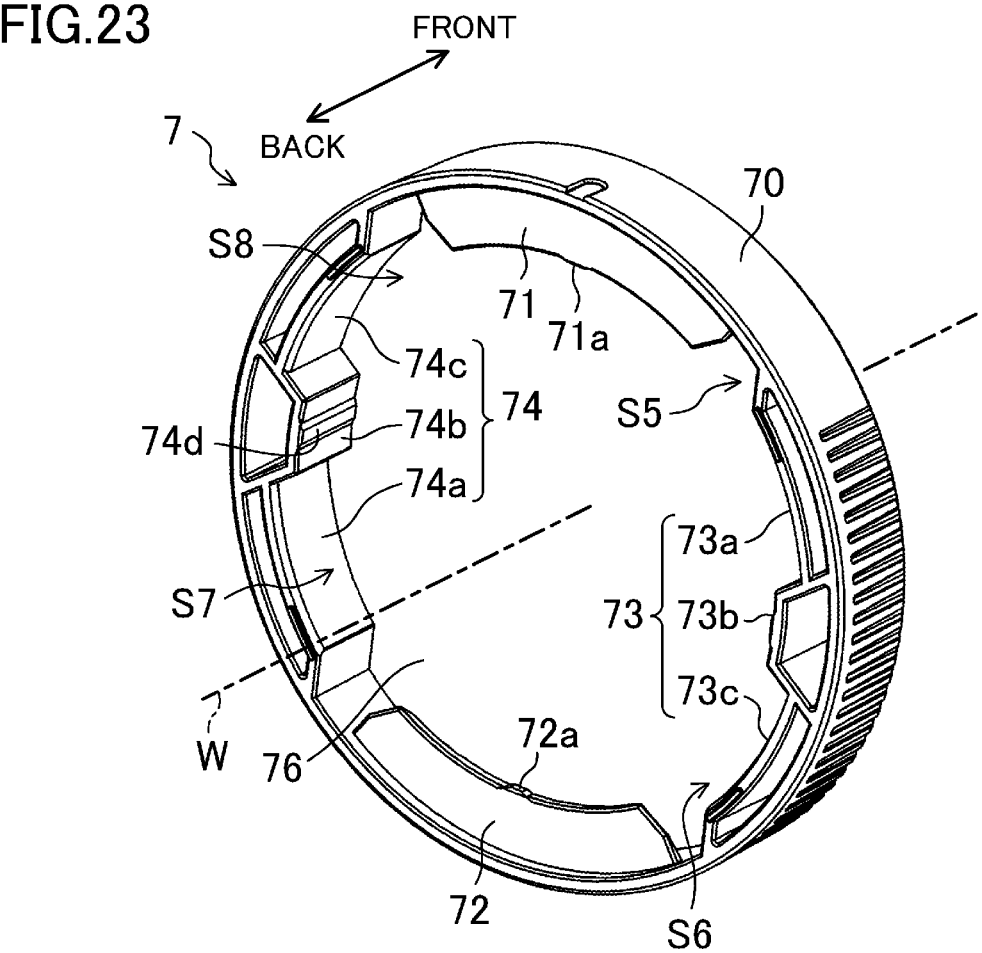
FIG. 23 is an oblique view of a lens cap.
Figure 24:
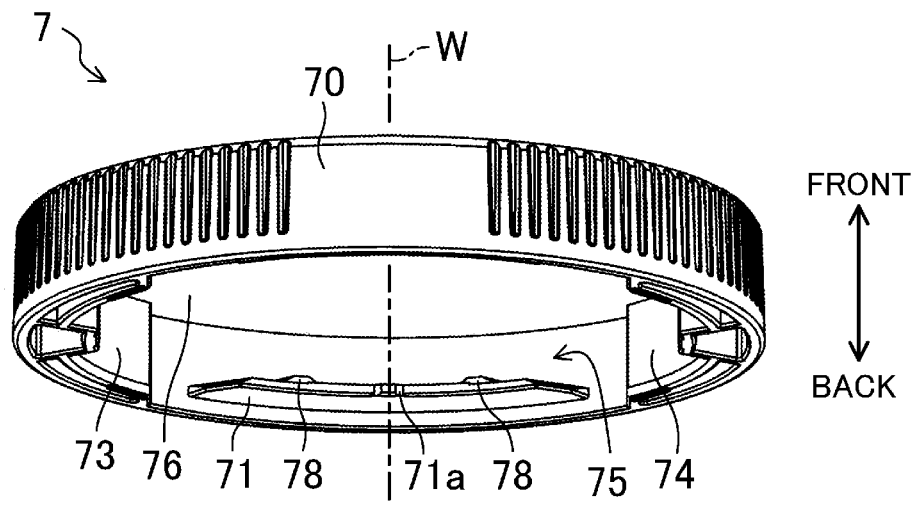
FIG. 24 is the lens cap viewed from a different oblique angle.

In the case where the intermediate ring 2 remains attached to the lens barrel 1A, a suitable lens cap 7 is attached. FIG. 23 is an oblique view of the lens cap 7. FIG. 24 is the lens cap 7 viewed from another oblique angle.

The lens cap 7 is a resin member which includes: a cylindrical body 70; first and second engagement walls 71, 72 provided on an inner circumferential surface of the body 70; first and second guide walls 73, 74 provided on the inner circumferential surface of the body 70; an engagement portion 75 (see FIG. 25) which engages with the intermediate ring 2 to determine the relative positioning of the lens cap 7 and the intermediate ring 2 in the optical axis direction and the circumferential direction; and a disc-like front wall 76 provided at a front end edge of the body 70. The inner diameter of the body 70 is larger than the diameter of a circle in contact with the tip end surfaces 24b of the two engagement claws 24 of the intermediate ring 2. The lens cap 7 is an example first member.

[5-1. First and Second Engagement Walls]

Each of the first and second engagement walls 71, 72 is a wall orthogonal to the optical axis and having an arc shape with respect to the optical axis as a center. The first and second engagement walls 71, 72 protrude from the inner circumferential surface of the body 70 radially inward. The first and second engagement walls 71, 72 are positioned at locations opposed to each other with the optical axis interposed therebetween, that is, locations shifted from each other by 180° in the circumferential direction. The first and second engagement walls 71, 72 respectively have, at a middle of the circumferential direction, protrusions 71a, 72a which protrude radially inward. The tip ends of the protrusions 71a, 72a are located on one circle whose center coincides with the central axis W. The diameter of this circle is approximately the same as the outer diameter of the cylindrical portion 23 of the intermediate ring 2. The first engagement wall 71 is provided with the engagement portion 75. The details of the engagement portion 75 will be described later. The first and second engagement walls 71, 72 are an example second engagement portion.

[5-2. Engagement Portion]

The engagement portion 75 changes the rotation torque during the attachment of the lens cap 7 to the intermediate ring 2 and which restricts a relative displacement of the lens cap 7 with respect to the intermediate ring 2 in the circumferential direction and the optical axis direction. More specifically, the engagement portion 75 includes a pair of projecting portions 78 as shown in FIG. 24. As will be described in detail later, the projecting portions 78 are portions which come in contact with the engagement claw 24 of the intermediate ring 2 in attaching the lens cap 7 to the intermediate ring 2. That is, the engagement claw 24 and the pair of projecting portions 78 form a torque change portion which changes the rotation torque in attaching the lens cap 7 to the intermediate ring 2 so that the rotation torque is larger at a preceding side and a succeeding side of the attachment position in the circumferential direction, and is smaller than the larger rotation torque at the attachment position. Further, the engagement claw 24 and the projecting portions 78 form a torque increase portion which increases the rotation torque in attaching the lens cap 7 to the intermediate ring 2. The pair of projecting portions 78 are provided on a front surface of the first engagement wall 71, and spaced apart from each other in the circumferential direction. The projecting portions 78 protrude forward from the front surface of the first engagement wall 71. Each of the projecting portions 78 has an approximately truncated pyramid shape. That is, each of the projecting portions 78 includes a tip end surface 78b parallel to the front surface of the first engagement wall 71, and inclined end surfaces 78a, 78c which extend from both edges of the tip end surface 78b in the circumferential direction and incline toward the front surface of the first engagement wall 71 (see FIG. 25). Of the two inclined end surfaces 78a, 78c, the inclined end surface 78a closer to the edge of the first engagement wall 71 in the circumferential direction is referred to as an "outer inclined end surface 78a", and the inclined end surface 78c located closer to a middle portion of the first engagement wall 71 in the circumferential direction is referred to as an "inner inclined end surface 78c." Each of the two inclined end surfaces 78a, 78c is inclined such that the circumferential dimension of the projecting portion 78 gradually decreases toward the front. The inclination angle of the inner inclined end surface 78c with respect to the front surface of the first engagement wall 71 is larger than the inclination angle of the outer inclined end surface 78a. The shapes of the two projecting portions 78 are symmetric with respect to a straight line which passes through the middle of the first engagement wall 71 in the circumferential direction and extends in the radial direction.

[5-3. First and Second Guide Walls]

The first and second guide walls 73, 74 are positioned at locations opposed to each other with the optical axis interposed therebetween, that is, locations shifted from each other by 180° in the circumferential direction. The first guide wall 73 is provided between the first engagement wall 71 and the second engagement wall 72 in the circumferential direction. The second guide wall 74 is provided between the second engagement wall 72 and the first engagement wall 71 in the circumferential direction.

The configuration of the first guide wall 73 and the configuration of the second guide wall 74 are similar to each other. Thus, the configuration of only the second guide wall 74 will be described. As shown in FIG. 23, the second guide wall 74 is parallel to the central axis W, and extends in the circumferential direction. The second guide wall 74 includes a small-diameter portion 74b, and large-diameter portions 74a, 74c located on both sides of the small-diameter portion 74b in the circumferential direction. The small-diameter portion 74b is provided with a protrusion 74d which protrudes radially inward. The distance from the central axis W to the small-diameter portion 74b is approximately the same as the radius of the cylindrical portion 23 of the intermediate ring 2. The large-diameter portions 74a, 74c are located on a circle whose center coincides with the central axis W. The diameter of this circle is approximately the same as the diameter of a circle in contact with the tip end surfaces 24b of the two engagement claws 24 of the intermediate ring 2.

A small-diameter portion 73b and a protrusion 73d of the first guide wall 73, and the small-diameter portion 74b and the protrusion 74d of the second guide wall 74 are positioned at locations opposed to each other with the central axis W interposed therebetween, that is, locations shifted from each other by 180° in the circumferential direction. The small-diameter portion 73b of the first guide wall 73 is provided between the first engagement wall 71 and the second engagement wall 72 in the circumferential direction. The small-diameter portion 74b of the second guide wall 74 is provided between the second engagement wall 72 and the first engagement wall 71 in the circumferential direction. Further, fifth to eighth spaces S5-S8 which allow the engagement claws 24 to pass through in the optical axis direction (in other words, spaces which allow the engagement claws 24 to pass by the first or second engagement wall 71, 72 in the optical axis direction) are respectively formed between the first engagement wall 71 and the small-diameter portion 73b of the first guide wall 73, between the small-diameter portion 73b of the first guide wall 73 and the second engagement wall 72, between the second engagement wall 72 and the small-diameter portion 74b of the second guide wall 74, and between the small-diameter portion 74b of the second guide wall 74 and the first engagement wall 71, in the circumferential direction.

[5-4. Attachment and Detachment of Lens Cap]

The attachment and detachment of the lens cap 7 to and from the intermediate ring 2 will be described below. In the following descriptions, the attachment and detachment in moving the lens cap 7 with respect to the intermediate ring 2 will be described. However, these movements are relative movements. Thus, the intermediate ring 2 may be moved with respect to the lens cap 7 (with the lens barrel 1), or both of the intermediate ring 2 and the lens cap 7 can be moved.

[5-4-1. Attachment of Lens Cap]

Figure 25A:
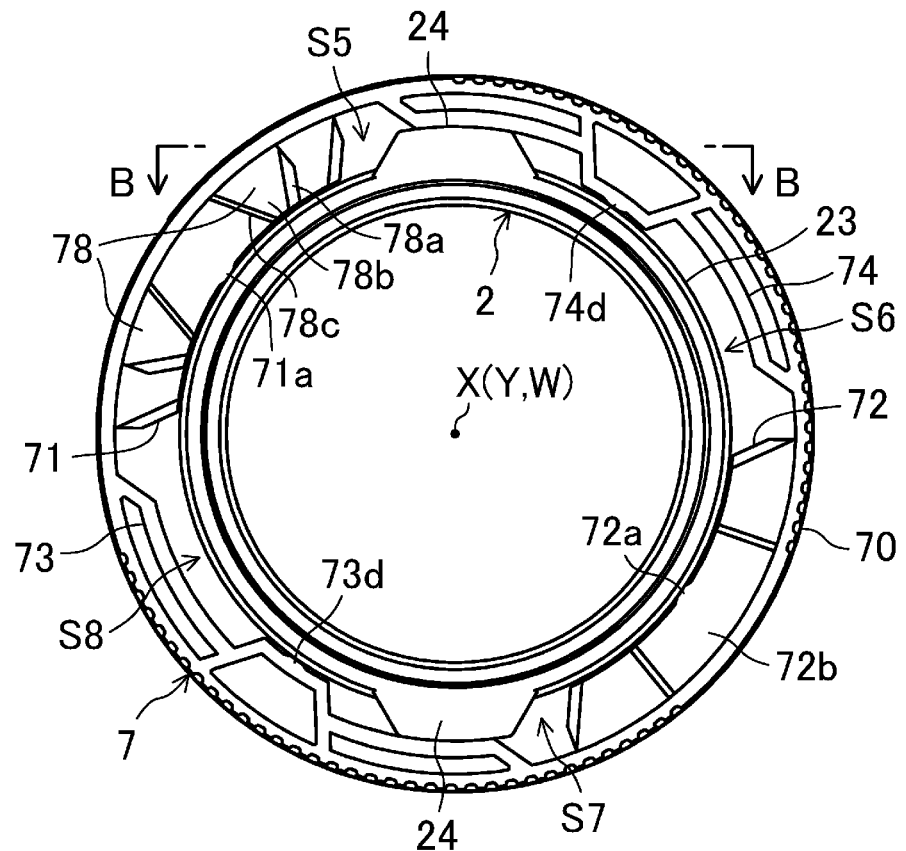
FIG. 25A shows a cross-section corresponding to FIG. 17B in the state in which the engagement claws of the intermediate ring are brought into the lens cap.
Figure 26A:
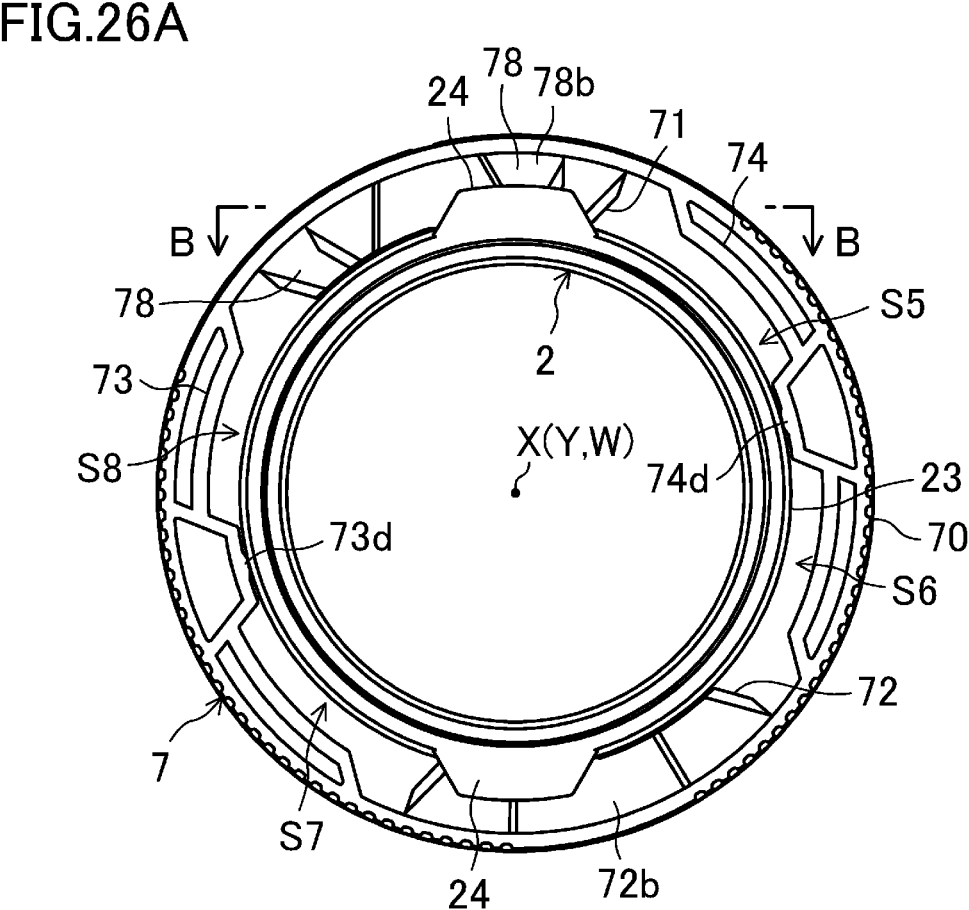
FIG. 26A shows a cross-section corresponding to FIG. 17B at the time when the rotation torque is the largest during the attachment.
Figure 26B:
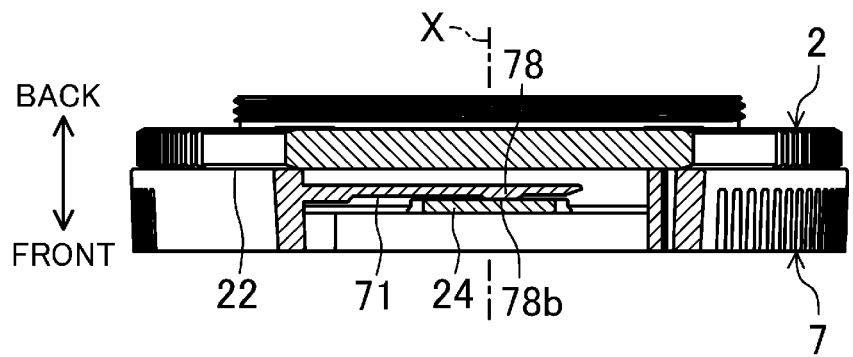
FIG. 26B shows a cross-section taken along the line B-B of FIG. 26A.
Figure 27A:
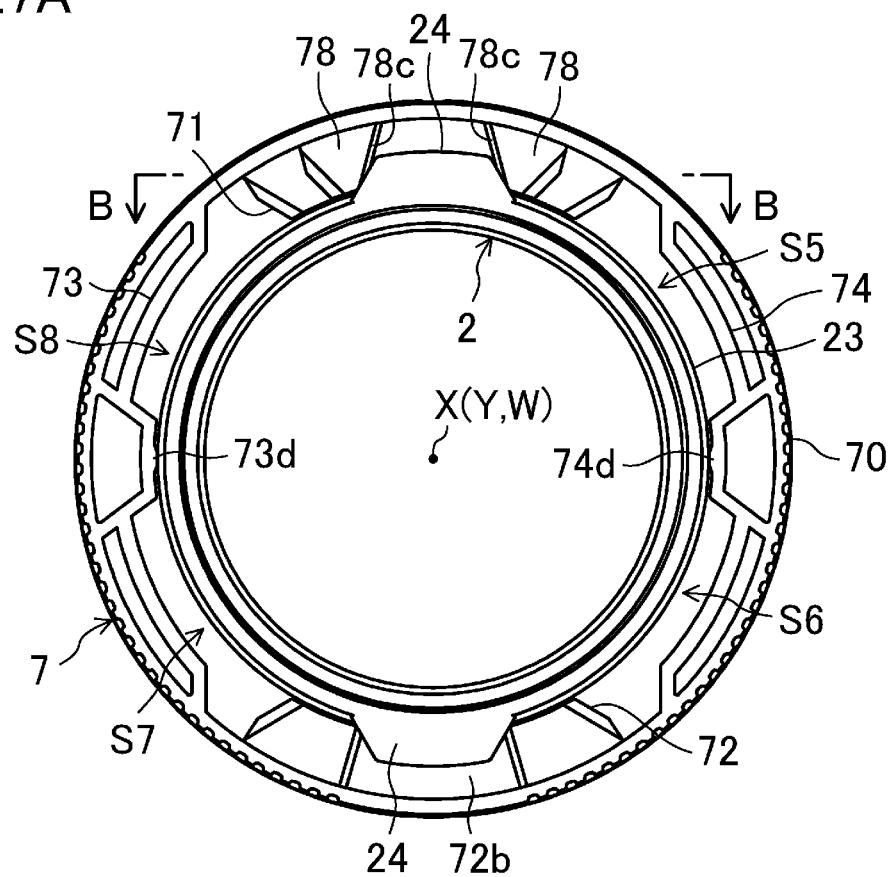
FIG. 27A is a cross-section corresponding to FIG. 17B at the time when the engagement claw is located at the attachment position.
Figure 27B:
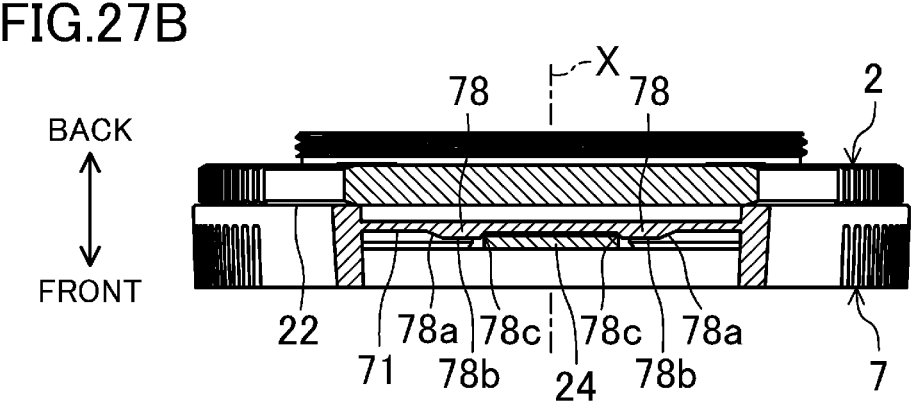
FIG. 27B shows a cross-section taken along the line B-B of FIG. 27A.

The lens cap 7 is attached to the intermediate ring 2 attached to the lens barrel 1. FIG. 25-27 show the states in respective steps of attaching the lens cap 7 to the intermediate ring 2. FIG. 25 shows the state in which the engagement claws 24 of the intermediate ring 2 are inserted in the lens cap 7. FIG. 26 shows the state in which the rotation torque is the largest during the attachment. FIG. 27 shows the state in which the engagement claw 24 is located at the attachment position.

First, as shown in FIG. 25, the position of the lens cap 7 and the position of the intermediate ring 2 are aligned in the circumferential direction so that the two engagement claws 24 of the intermediate ring 2 can be located in any of the fifth to eighth spaces S5-S8. The two engagement claws 24 are positioned at locations shifted from each other by 180°, and each of the fifth to eighth spaces S5-S8 has a corresponding one of the spaces at a location shifted by 180°. Thus, if the position of one of the engagement claws 24 in the circumferential direction is aligned with any one of the positions of the fifth to eighth spaces S5-S8 in the circumferential direction, the position of the other engagement claw 24 is also aligned with the position of one of the fifth to eighth spaces S5-S8 in the circumferential direction. In the following description, the two engagement claws 24 are aligned with the fifth and seventh spaces S5, S7.

After that, the lens cap 7 is moved in the optical axis direction to insert the engagement claws 24 in the fifth and seventh spaces S5, S7.

As described above, the fifth to eighth spaces S5-S8 are wide enough for the engagement claws 24 to pass in the optical axis direction. Thus, when the lens cap 7 is brought close to the intermediate ring 2, the engagement claws 24 pass through the fifth and seventh spaces S5, S7 in the optical axis direction. That is, the engagement claws 24 pass the first and second engagement walls 71, 72 in the optical axis direction to be inserted in the lens cap 7.

Figure 25B:
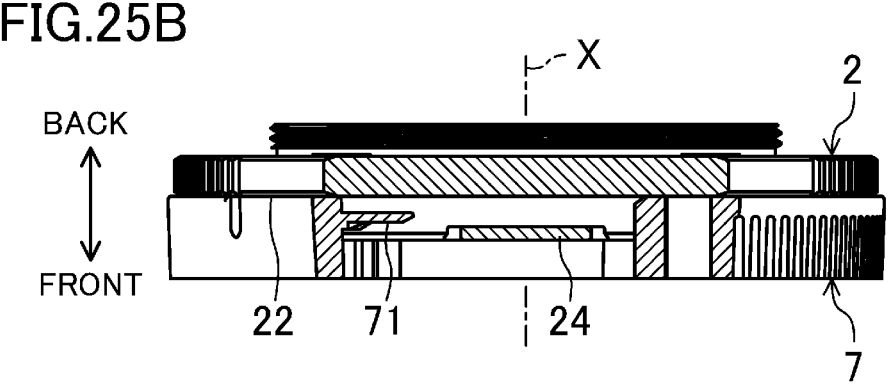
FIG. 25B shows a cross-section taken along the line B-B of FIG. 25A.

As shown in FIG. 25B, the lens cap 7 is moved in the optical axis direction until the back end of the lens cap 7 comes in contact with the front wall 22 of the intermediate ring 2. In the state in which the back end of the lens cap 7 is in contact with the front wall 22, the lens cap 7 is positioned on the front side of the intermediate ring 2, whereas the first and second engagement walls 71, 72 are positioned on the back side of the engagement claws 24 (in FIG. 25B, only the first engagement wall 71 is shown). That is, the anterior-posterior relationship of the lens cap 7 and the intermediate ring 2 is opposite to the anterior-posterior relationship of the first and second engagement walls 71, 72 and the engagement claws 24. The engagement claws 24 are not in contact with any member at this time.

As shown in FIG. 25A, when the engagement claws 24 are brought into the lens cap 7, the protrusions 71a, 72a, 73d, 74d of the lens cap 7 come in contact with the outer circumferential surface of the cylindrical portion 23 of the intermediate ring 2. Thus, the central axis W of the lens cap 7 aligns with the central axis Y of the intermediate ring 2, which leads to alignment with the optical axis X of the lens barrel 1.

Next, the lens cap 7 is relatively rotated with respect to the intermediate ring 2 about the optical axis X so that the first and second engagement walls 71, 72 are moved to in front of the two engagement claws 24.

Specifically, since the two engagement claws 24 are aligned with the fifth and seventh spaces S5, S7 as described above, the lens cap 7 is rotated clockwise when viewed facing back in the optical axis direction. Since the contact between the protrusions 71a, 72a, 73d, 74d of the lens cap 7 and the cylindrical portion 23 of the intermediate ring 2 is maintained at this time, the lens cap 7 is rotated about the optical axis X, with the central axis W being aligned with the optical axis X of the lens barrel 1.

In the case where the two engagement claws 24 are aligned with the sixth and eighth spaces S6, S8, the lens cap 7 is rotated counterclockwise when viewed facing back in the optical axis direction.

As a result, the first and second engagement walls 71, 72 start to overlap with the two engagement claws 24 in the anterior-posterior direction. If the back end of the lens cap 7 is in contact with the front wall 22 of the intermediate ring 2, the engagement claws 24 do not come in contact with the first and second engagement walls 71, 72. There is a space between each of the two engagement claws 24 and the corresponding one of the first and second engagement walls 71, 72 in the anterior-posterior direction. That is, in this state, the lens cap 7 and the intermediate ring 2 can relatively move in the optical axis direction in this space.

As the relative movement of the lens cap 7 and the intermediate ring 2 goes on, one of the projecting portions 78 of the first engagement wall 71 comes in contact with one of the engagement claws 24. Specifically, the outer inclined end surface 78a of the projecting portion 78 comes in contact with the engagement claw 24. The rotation torque of the relative rotation between the lens cap 7 and the intermediate ring 2 starts to increase from the time when the projecting portion 78 and the engagement claw 24 come in contact with each other. Further, the positions of the lens cap 7 and the intermediate ring 2 in the optical axis direction start to be restricted by the contact between the projecting portion 78 and the engagement claw 24.

As the relative rotation between the lens cap 7 and the intermediate ring 2 goes on from this state, the first engagement wall 71 is distorted and deformed forward, and as shown in FIG. 26, the tip end surface 78b of the projecting portion 78 comes in contact with the back surface of the engagement claws 24. Since FIG. 26 omits showing the deformation of the first engagement wall 71, the engagement claw 24 and the projecting portion 78 overlap each other in the drawing. The rotation torque gradually increases during this period. The rotation torque is approximately the largest rotation torque in the state in which the tip end surface 78b of the projecting portion 78 and the back surface of the engagement claw 24 are in contact with each other.

As the relative rotation between the lens cap 7 and the intermediate ring 2 goes on, the inner inclined end surface 78c of the projecting portion 78 comes in contact with the engagement claw 24. The deformation of the first engagement wall 71 starts to be removed at this time. At the same time, the rotation torque starts to decrease.

Immediately after this, as shown in FIG. 27, the inner inclined end surface 78c of the other projecting portion 78 (located at a succeeding side of the rotation) comes in contact with the engagement claw 24. As a result, the engagement claw 24 is sandwiched between the two projecting portions 78 from both sides in the circumferential direction. The attachment of the lens cap 7 is completed at this point. This position is the attachment position. At the attachment position, movement of the engagement claw 24 in the circumferential direction is restricted by the projecting portions 78. Thus, movement of the lens cap 7 with respect to the intermediate ring 2 in the circumferential direction is restricted. Further, since each of the projecting portions 78 is in contact with a ridge portion formed by the corresponding inclined end surface and the back surface of the engagement claw 24, not only the circumferential movement, but also the forward movement of the engagement claw 24 is restricted by the projecting portions 78. In addition, the backward movement of the lens cap 7 with respect to the intermediate ring 2 is restricted since the back end of the lens cap 7 is in contact with the front wall 22 of the intermediate ring 2. Accordingly, movement of the lens cap 7 with respect to the intermediate ring 2 in the optical axis direction is restricted.

The positional relationship between the second engagement wall 72 and the other engagement claw 24 is changed similarly to the positional relationship between the first engagement wall 71 and the engagement claw 24 described above. That is, when the two projecting portions 78 of the first engagement wall 71 are in contact with one of the engagement claws 24, the other engagement claw 24 is positioned approximately at a middle of the second engagement wall 72 in the circumferential direction. The second engagement wall 72 has a raised portion 72b at a middle portion of the front surface of the second engagement wall 72 in the circumferential direction. The raised portion 72b has an approximately truncated pyramid shape, and is raised forward from the front surface of the second engagement wall 72. That is, the engagement claw 24 is in contact with the raised portion 72b. As a result, the forward movement of the engagement claw 24 is restricted.

[5-4-2. Detachment of Lens Cap]

Next, in detaching the lens cap 7 from the intermediate ring 2, the lens cap 7 is relatively rotated with respect to the intermediate ring 2 about the optical axis X from the attachment position. The eighth and fifth spaces S8, S5 are formed on sides of the first engagement wall 71 in the circumferential direction, and the sixth and seventh spaces S6, S7 are formed on sides of the second engagement wall 72 in the circumferential direction. Thus, the lens cap 7 can be detached by relatively rotating the lens cap 7 with respect to the intermediate ring 2 in either circumferential direction. In the following description, the case in which the lens cap 7 is detached by rotating the lens cap 7 clockwise when viewed facing back in the optical axis direction, will be described.

When the lens cap 7 is relatively rotated clockwise as described above, the projecting portion 78 located at a preceding side of the rotation moves away from the engagement claw 24, and the tip end surface 78b of the projecting portion 78 located at a succeeding side of the rotation comes in contact with the back surface of the engagement claw 24. The first engagement wall 71 is distorted and deformed toward the front at this time. Thus, the rotation torque gradually increases.

As the relative rotation between the lens cap 7 and the intermediate ring 2 goes on, the outer inclined end surface 78a of the projecting portion 78 comes in contact with the engagement claw 24. The deformation of the first engagement wall 71 starts to be removed at this time. At the same time, the rotation torque starts to decrease.

As the relative rotation between the lens cap 7 and the intermediate ring 2 goes on, the projecting portion 78 on the succeeding side of the rotation, too, moves away from the engagement claw 24. The rotation torque is the smallest at this time.

As the relative rotation between the lens cap 7 and the intermediate ring 2 goes on, the engagement claw 24 is positioned at a location which is not aligned with the first engagement wall 71 in the anterior-posterior direction, that is, positioned in the fifth space S5 in the circumferential direction. Similarly, the second engagement wall 72 is positioned in the seventh space S7 in the circumferential direction, and the engagement claw 24 is positioned at a location which is not aligned with the second engagement wall 72 in the anterior-posterior direction.

After that, the lens cap 7 and the intermediate ring 2 are moved away from each other in the optical axis direction, and thereby the two engagement claws 24 pass through the fifth and seventh spaces S5, S7 and pass by the first and second engagement walls 71, 72. As a result, the lens cap 7 is detached from the intermediate ring 2.

Here, to detach the lens cap 7 from the intermediate ring 2 by rotating the lens cap 7 counterclockwise when viewed facing back in the optical axis direction, the two engagement claws 24 are made to pass through the eighth and sixth spaces S8, S6.

[6. Advantages]

The attachment structure described above is configured to attach a conversion lens 3 to an intermediate ring 2 by relatively rotating the conversion lens 3 and the intermediate ring 2 in a circumferential direction about an optical axis X. The attachment structure includes an engagement claw 24 which is provided at the intermediate ring 2 and which protrudes in a radial direction with respect to the optical axis X as a center, and a first engagement wall 51 which is provided at the conversion lens 3 and which engages with the engagement claw 24 at least at a predetermined attachment position in the circumferential direction to restrict a relative movement of the conversion lens 3 and the intermediate ring 2 in the optical axis direction, wherein the conversion lens 3 is provided with fourth and first spaces S4, S1 which allow the engagement claw 24 to pass by the first engagement wall 51 in the optical axis direction, at both sides of the first engagement wall 51 in the circumferential direction, and the conversion lens 3 and the intermediate ring 2 include the engagement claw 24 and a pair of projecting portions 63 which change a torque during the relative rotation between the conversion lens 3 and the intermediate ring 2 so that the torque is larger at a preceding side and a succeeding side of the attachment position in the circumferential direction, than at the attachment position.

Further, a lens unit has a conversion lens 3 and an intermediate ring 2, which are relatively rotated in a circumferential direction about an optical axis X to attach the conversion lens to the intermediate ring. The lens unit includes an engagement claw 24 which is provided at the intermediate ring 2 and which protrudes in a radial direction with respect to the optical axis X as a center, and a first engagement wall 51 which is provided at the conversion lens 3 and which engages with the engagement claw 24 at least at a predetermined attachment position in the circumferential direction to restrict a relative movement of the conversion lens 3 and the intermediate ring 2 in the optical axis direction, wherein the conversion lens 3 includes fourth and first spaces S4, S1 which allow the engagement claw 24 to pass by the first engagement wall 51 in the optical axis direction, at both sides of the first engagement wall 51 in the circumferential direction, and the conversion lens 3 and the intermediate ring 2 include the engagement claw 24 and a pair of projecting portions 63 which serve as a torque change portion for changing a torque during the relative rotation between the conversion lens 3 and the intermediate ring 2 so that torque is larger at a preceding side and a succeeding side of the attachment position in the circumferential direction, than at the attachment position.

According to the above configuration, the engagement claw 24 sequentially passes by one of the projecting portions 63, the attachment position, and the other projecting portion 63 in a relative manner in the circumferential direction when the conversion lens 3 is attached to and detached from the intermediate ring 2. The rotation torque of the conversion lens 3 is small on a preceding side of the one of the projecting portions 63, increases at the one of the projecting portions 63, decreases a little at the attachment position, increases at the other projecting portion 63, and decreases after passing by the other projecting portion 63. That is, the rotation torque is changed in the order of a small rotation torque, a large rotation torque, and a small rotation torque when a user attaches the conversion lens 3 to the intermediate ring 2. Thus, the user can easily feel that the engagement claw 24 has passed by one of the projecting portions 63 and reached the attachment position. Further, when the engagement claw 24 is about to pass the attachment position, the rotation torque increases again. Thus, it is possible to prevent the engagement claw 24 from overpassing the attachment position. In addition, since the rotation torque is changed in the order of a large rotation torque, a small rotation torque, and a large rotation torque on the preceding side and the succeeding side of the attachment position, the engagement claw 24 can give the user a feel that the engagement claw 24 has fitted into the space between the two projecting portions 63 (hereinafter referred to as a "click feel"). As a result, the user can easily feel that the engagement claw 24 has located at the attachment position. Further, the rotation torque increases again if the engagement claw 24 overpasses the attachment position. However, the rotation torque decreases thereafter. Thus, it is possible to prevent an excessive rotation torque from being applied to the intermediate ring 2 and the conversion lens 3, which results in preventing the excessive rotation torque from being applied to the lens barrel 1. Thus, not only the intermediate ring 2 and the conversion lens 3, but also the lens barrel 1 to which the intermediate ring 2 is attached are prevented from being damaged.

Further, the fourth and first spaces S4, S1 which allow the engagement claws 24 to pass by the first engagement wall 51 in the optical axis direction are provided at both sides of the first engagement wall 51 in the circumferential direction. In addition, the rotation torque is changed in the order of a small rotation torque, a large rotation torque, a small rotation torque, a large rotation torque, and a small rotation torque, even if the conversion lens 3 is rotated in either circumferential direction with respect to the intermediate ring 2. Thus, even in the case where the engagement claw 24 is made to pass through the fourth space S4, or made to pass through the first space S1 when bringing the engagement claw 24 into the conversion lens 3, the engagement claw 24 can be positioned at the attachment position by being rotated in different circumferential directions. In other words, the conversion lens 3 can be attached to the intermediate ring 2 by rotating in either direction. This is the same when detaching the conversion lens 3. The conversion lens 3 can be detached from the intermediate ring 2 by rotating in either direction. Here, regardless of the rotational direction of the conversion lens 3, the user can feel that the engagement claw 24 has reached at the attachment position; the engagement claw 24 can be prevented from overpassing the attachment position; and generation of excessive rotation torque can be prevented. As a result, it is possible to improve the workability of the attachment and detachment of the conversion lens 3.

Further, the circumferential movement of the engagement claw 24 at the attachment position, that is, the relative rotation of the conversion lens 3, can be restricted by the projecting portions 63 provided at both sides of the attachment position in the circumferential direction.

Further, the fourth and first spaces S4, S1 which allow the engagement claws 24 to pass by the first engagement wall 51 in the optical axis direction are provided at both sides of the first engagement wall 51 in the circumferential direction, and the engagement claws 24 can move from the first space S1 to fourth space S4 in the circumferential direction. Thus, the rotational direction when attaching the conversion lens 3 and the rotational direction when detaching the conversion lens 3 can be the same. This is particularly advantageous to the configuration in which the intermediate ring 2 is provided, on the side oppose to the conversion lens 3 in the optical axis direction, with the external thread 26 for attaching the intermediate ring 2 to the lens barrel 1 by rotating the intermediate ring 2 in a first circumferential direction, and detaching the intermediate ring 2 from the lens barrel 1 by rotating the intermediate ring 2 in a second circumferential direction. The rotation torque of the conversion lens 3 is transmitted to the intermediate ring 2 when the conversion lens 3 is attached to and detached from the intermediate ring 2. In the case where the rotation torque of the conversion lens 3 is in the direction along which the intermediate ring 2 is detached from the lens barrel 1, the fastening of the intermediate ring 2 and the lens barrel 1 may be loosened. However, according to the above configuration, the conversion lens 3 can be attached and detached by being rotated in one rotational direction. Thus, it is possible to prevent the loosening of the intermediate ring 2 and the lens barrel 1 during the attachment and detachment of the conversion lens 3 by setting the one rotational direction of the conversion lens 3 during attachment and detachment of the conversion lens 3 to the rotational direction of the intermediate ring 2 when the intermediate ring 2 is attached to the lens barrel 1.

In the above embodiment, the external thread 26 is provided as an attachment portion for attaching the intermediate ring 2 to the lens barrel 1 by rotating the intermediate ring 2 in a first circumferential direction, and detaching the intermediate ring 2 from the lens barrel 1 by rotating the intermediate ring 2 in a second circumferential direction, but the attachment portion is not limited to the external thread 26. For example, a bayonet-type attachment portion which is fastened by being rotated in a first circumferential direction, and loosened by being rotated in a second circumferential direction, may be used.

The intermediate ring 2 having the external thread 26 to be screwed into the filter thread 11 of the lens barrel 1 can be attached to various types of lens barrels 1, because the filter thread 11 is a general-purpose thread, and is used in various types of lens barrels 1. Accordingly, the above attachment structure can be applied to various types of lens barrels 1.

The attachment structure is configured to attach the conversion lens 3 to the intermediate ring 2 by relatively rotating the conversion lens 3 and the intermediate ring 2 in the circumferential direction about an optical axis X. The attachment structure includes an engagement claw 24 which is provided at the intermediate ring 2 and which protrudes in a radial direction with respect to the optical axis X as a center, and a first engagement wall 51 which is provided at the conversion lens 3 and which engages with the engagement claw 24 at least at a predetermined attachment position during the rotation in the circumferential direction to restrict a relative movement of the conversion lens 3 and the intermediate ring 2 in the optical axis direction and the circumferential direction, wherein the conversion lens 3 is provided with fourth and first spaces S4, S1 which allow the engagement claw 24 to pass by the first engagement wall 51 in the optical axis direction, at both sides of the first engagement wall 51 in the circumferential direction.

According to this configuration, even in the case where the engagement claw 24 is made to pass through the fourth space S4, or made to pass through the first space S1 when bringing the engagement claw 24 into the conversion lens 3, the engagement claw 24 can be positioned at the attachment position by being rotated in different circumferential directions. In other words, the conversion lens 3 can be attached to the intermediate ring 2 by rotating in either direction. This is the same when detaching the conversion lens 3. The conversion lens 3 can be detached from the intermediate ring 2 by rotating in either direction. Further, it is possible to prevent an excessive rotation torque.

Further, the intermediate ring 2 and the conversion lens 3 include the engagement claw 24 and the stopper 57 which serve as a rotation stopper restricting the rotation of the conversion lens 3 when the conversion lens 3 is rotated in the same circumferential direction as the direction along which the intermediate ring 2 is detached from the lens barrel 1. According to this configuration, the intermediate ring 2 can be rotated by the rotation of the conversion lens 3, thereby making it possible to easily detach the intermediate ring 2 from the lens barrel 1.

Further, the conversion lens 3 includes the second and fourth engagement walls 52, 54 which, in the state where the rotation of the conversion lens 3 is restricted by the engagement claw 24 and the stopper 57, are aligned with the engagement claw 24 in the optical axis direction to restrict relative movement of the conversion lens 3 and the intermediate ring 2 in the optical axis direction. According to this configuration, the intermediate ring 2 can be held on the conversion lens 3 when the intermediate ring 2 is detached from the lens barrel 1 by rotating the intermediate ring 2 via the conversion lens 3. Thus, it is possible to prevent the intermediate ring 2 from being dropped.

Further, the intermediate ring 2 and the conversion lens 3 include the engagement claw 24 and the stopper 57 which serve as a rotation stopper restricting the rotation of the conversion lens 3 when the conversion lens 3 is rotated in the same circumferential direction as the direction along which the intermediate ring 2 is attached to the lens barrel 1. According to this configuration, the intermediate ring 2 can be rotated by the rotation of the conversion lens 3, thereby making it possible to easily attach the intermediate ring 2 to the lens barrel 1.

As described above, the intermediate ring 2 and the conversion lens 3 include the engagement claw 24 and the stopper 57 which serve as a rotation stopper limiting the relative rotation of the engagement claw 24 in the circumferential direction, at least within an area including the first engagement wall 51 and the fourth and first spaces S4, S1 located at both sides of the first engagement wall 51 in the circumferential direction. According to this configuration, the attachment and detachment of the intermediate ring 2 can be assisted by the rotation torque of the conversion lens 3.

Further, by using the engagement claws 24 of the intermediate ring 2 to change the rotation torque, it is possible to reduce the number of components, and prevent an increase in size of the attachment structure. It is also possible to change the rotation torque by portions provided separately from the engagement claws 24 on each of the intermediate ring 2 and the conversion lens 3, and engaged with each other to increase the rotation torque. However, the rotation torque is changed by using the engagement claws 24 which are the members essentially for restricting the movement of the intermediate ring 2 and the conversion lens 3 in the axial direction. The number of components can therefore be reduced, which lead to prevention of an increase in size of the attachment structure.

Further, the projecting portions 63 are provided on the back frame 5 between two attachment walls 55 in the circumferential direction. Thus, the rotation torque can be smoothly changed. That is, part of the back frame 5 which is located between the two attachment walls 55 in the circumferential direction is an area which is not fixed to the lens frame 4, that is, an area whose movement is not restricted. Thus, when the projecting portion 63 slides on the engagement claw 24, part of the back frame 5 adjacent to the projecting portion 63 can be deformed in the radial direction. Due to manufacturing errors and assembly errors, the rotation torque at the time when the projecting portion 63 slides on the engagement claw 24 may increase too much, and it may become difficult to make a relative rotation of the conversion lens 3. However, if the part of the back frame 5 adjacent to the projecting portion 63 can be deformed in the radial direction, the excessive rotation torque can be absorbed by the deformation of the back frame 5. As a result, it is possible to smoothly change the rotation torque, and possible to make a smooth relative rotation of the conversion lens 3.

Further, when the engagement claw 24 and the projecting portion 63 are brought into contact with each other, the edge surfaces of the engagement claw 24 which are approximately parallel to the optical axis (specifically, the tip end surface 63b and the two inclined end surfaces 63a, 63c) are brought into contact with the projecting portion 63. Another example of the configuration in which the engagement claw 24 and the projecting portion 63 are brought into contact with each other, thereby changing the rotation torque, is that an edge surface of the engagement claw 24 which is approximately parallel to the radial direction (specifically, the back surface of the engagement claw 24) is brought into contact with the projecting portion 78, as in the case of the intermediate ring 2 and the lens cap 7. In the former example, the projecting portion 63 rides on the engagement claw 24 in the radial direction. In the latter example, the projecting portion 78 rides on the engagement claw 24 in the optical axis direction. To absorb the excessive rotation torque by the deformation of the back frame 5 as described above, the back frame 5 is deformed in the radial direction in the former example, whereas in the latter example, the back frame 5 is deformed in the optical axis direction. The back frame 5 is an approximately cylindrical member, and is easily deformed in the radial direction. Thus, it is possible to easily absorb the excessive rotation torque by the deformation of the back frame 5, which is deformed by bringing the projecting portion 63 to ride on the engagement claw 24 in the radial direction.

Further, when engagement claw 24 and the projecting portion 63 come in contact with each other at the attachment position, a surface of one member and a ridge portion of the other member come in contact with each other. Thus, the user can easily feel a click. Specifically, the inclined end surfaces 24a, 24c of the engagement claw 24 come in contact with a ridge portion of the projecting portions 63. Thus, the user can clearly feel a click when the engagement claw 24 has fitted into the space between the two projecting portions 63.

Further, the first and third engagement walls 51, 53 are provided on the conversion lens 3, and the engagement claws 24 are provided on the intermediate ring 2 in the configuration of attaching the conversion lens 3 to the intermediate ring 2. Due to this configuration, it is possible to improve aesthetic impression of the lens barrel 1 and the intermediate ring 2 even when the intermediate ring 2 remains attached to the lens barrel 1 while the conversion lens 3 is not used. The engagement claws 24 have a simple configuration and small dimensions, compared to the first and third engagement walls 51, 53. Thus, even if the engagement claws 24 are exposed on the front side of the lens barrel 1, the aesthetic impression of the lens barrel 1 does not much deteriorate. As a result, the lens barrel 1 can be used, with the intermediate ring 2 attached to the lens barrel 1, even when the conversion lens 3 is not attached.

If the lens barrel 1 can be used, with the intermediate ring 2 attached to the lens barrel 1, any member other than the conversion lens 3 can be attached to the lens barrel 1 as long as the member can be attached to and detached from the intermediate ring 2. Thus, it is possible to provide a versatile attachment structure. For example, the lens cap 7 can be attached to the lens barrel 1 to which the intermediate ring 2 remains attached.

Specifically, the attachment structure of the lens cap 7 is configured to attach the lens cap 7 to the intermediate ring 2 by relatively rotating in the circumferential direction about the optical axis X. The attachment structure of the lens cap 7 includes a first engagement wall 71 which engages with the engagement claw 24 at least at a predetermined attachment position in the circumferential direction to restrict a relative movement between the lens cap 7 and the intermediate ring 2 in the direction of the axis, wherein the lens cap 7 is provided with spaces S5, S8 which allow the engagement claw 24 to pass by the first engagement wall 71 in the optical axis direction, at both sides of the first engagement wall 71 in the circumferential direction, and the lens cap 7 and the intermediate ring 2 include a pair of projecting portions 78 and the engagement claw 24 for changing a torque during the relative rotation between the lens cap 7 and the intermediate ring 2 so that the torque is larger at a preceding side and a succeeding side of the attachment position in the circumferential direction, than at the attachment position.

According to the above configuration, similar to the case in which the conversion lens 3 is attached to the intermediate ring 2, it is possible to prevent application of an excessive rotation torque to the intermediate ring 2 during attachment of the lens cap 7 to the intermediate ring 2, attach and detach the lens cap 7 by rotating the lens cap 7 in either circumferential direction, and easily feel that the engagement claw 24 is positioned at the attachment position.

Further, the conversion lens 3 is provided with the second engagement wall 52 at a location opposite to the first engagement wall 51, with the first space S1 interposed therebetween, a fourth engagement wall 54 at a location opposite to the first engagement wall 51, with the fourth space S4 interposed therebetween, and the stopper 57 which stops the rotation of the conversion lens 3 when the engagement claw 24 overpasses the first space S1 and overlaps with the second engagement wall 52 in the anterior-posterior direction, and which stops the rotation of the conversion lens 3 when the engagement claw 24 overpasses the fourth space S4 and overlaps with the fourth engagement wall 54 in the anterior-posterior direction. Due to this configuration, it is possible to separate the process in which the engagement claw 24 and the first engagement wall 51 are disengaged, from the process in which the conversion lens 3 is removed in the optical axis direction. By separating the disengagement process from the removal process, the conversion lens 3 can be gently rotated in the removal process, thereby making it possible to align the positions of the first space S1 and the engagement claw 24 in the circumferential direction. In the disengagement process, the engagement claw 24 needs to overpass the projecting portion 63, and thus, the rotation torque increases, and thereafter decreases. Thus, in the state in which the engagement claw 24 and the first engagement wall 51 are not aligned with each other in the anterior-posterior direction, there is a possibility that the conversion lens 3 is rotated fast. Accordingly, the engagement claws 24 may suddenly come out of the back frame 5 when the engagement claw 24 comes to the positions of the first and fourth spaces S1, S4. However, by providing the stopper 57 for setting a terminal end of the rotation of the conversion lens 3, and bringing the engagement claw 24 to align with the second or fourth engagement wall 52, 54 in the anterior-posterior direction at the terminal end, it is possible to prevent the engagement claw 24 from coming out of the back frame 5. That is, it is possible to complete only the disengagement process, and prevent change in the rotation torque in the removal process. As a result, the conversion lens 3 can be gently rotated in the removal process, thereby making it possible to align the positions of the first space S1 and the engagement claws 24 in the circumferential direction. As a result, it is possible to prevent the lens barrel 1 (including the camera body) and conversion lens 3, etc., from slipping off the user's hand.

Further, it is possible to prevent the inclination of the central axis Y of the intermediate ring 2 with respect to the optical axis Z of the conversion lens 3, by providing multiple combinations of the engagement claws 24 and the engagement walls. Specifically, the two engagement claws 24 and the first and third engagement walls 51, 53 are provided. In addition, multiple combinations of the engagement claws 24 and the engagement walls are positioned at regular intervals in the circumferential direction, thereby making it possible to further reduce the inclination of the central axis Y of the intermediate ring 2 with respect to the optical axis Z of the conversion lens 3. Specifically, a combination of one of the engagement claws 24 and the first engagement wall 51, and a combination of the other engagement claw 24 and the third engagement wall 53 are positioned at locations shifted from each other by 180° in the circumferential direction.

Further, there is one torque change portion 62 provided, which enables the user to clearly feel a click. If there are a plurality of torque change portions 62 provided, a click may occur at a plurality of locations in the circumferential direction when the attachment position of one torque change portion 62 does not correspond to the attachment position of another torque change portion 62 in the circumferential direction due to manufacturing errors and assembly errors. In contrast, if there is one torque change portion 62, the click can occur only once.

Other Embodiments

The embodiments may have the follow configurations.

For example, the object to be attached to the intermediate ring 2 is not limited to the conversion lens 3 and the lens cap 7. For example, an optical component, such as a filter, may be attached to the intermediate ring 2. Further, the object to which the intermediate ring 2 is attached is not limited to the lens barrel 1. Moreover, the above attachment structure is not limited to cameras and lenses. The above-described configuration can be applied to any attachment structure as long as the attachment structure is configured to attach a first member to a second member.

In the above embodiment, the engagement claws 24 are provided on the intermediate ring 2, and the first and third engagement walls 51, 53 are provided on the conversion lens 3, but the present disclosure is not limited to this configuration. The engagement claws 24 may be provided on the conversion lens 3, and the first and third engagement wall 53 may be provided on the intermediate ring 2. Further, the number of the engagement claws 24, and the number of the engagement walls are not limited to the numbers described in the above embodiment. The number of the engagement claws 24 or the engagement walls may be one, or may be three or more.

In the above embodiment, the projecting portions 63 are provided on the first engagement wall 51, but the present disclosure is not limited to this configuration. For example, the projecting portions 63 may be provided independently of the first engagement wall 51. That is, the rotation torque may be increased by engaging the projecting portions 63 with a member other than the engagement claws 24 which is provided on the intermediate ring 2. Alternatively, the projecting portions 63 may be provided on the intermediate ring 2, and the rotation torque may be increased by engaging the projecting portions 63 with a specific portion provided on the conversion lens 3.

In the above embodiment, the rotation torque is changed in the order of a small rotation torque, a large rotation torque, a small rotation torque, a large rotation torque, and a small rotation torque after the engagement claws 24 are brought into the back frame 5 and rotated, but the first and last areas where the rotation torque is small can be omitted. That is, when the engagement claws 24 are brought into the back frame 5 and rotated, the rotation torque may be large from the beginning of the rotation, and the rotation torque may become small only at the attachment position. After passing the attachment position, the rotation torque may remain large until the engagement claw 24 leaves the first engagement wall 51. However, the conversion lens 3 can be rotated more smoothly if the first and last regions where the rotation torque is small are provided.

An inclined end surface of the engagement claw 24 and a ridge portion of the projecting portion 63 are brought into contact to each other to change the torque, but the present disclosure is not limited to this configuration. For example, an inclined end surface of the engagement claw 24 and an inclined end surface of the projecting portion 63 may be brought into contact with each other. A ridge portion of the engagement claw 24 and an inclined end surface of the projecting portion 63 may be brought into contact with each other. A ridge portion of the engagement claw 24 and a ridge portion of the projecting portion 63 may be brought into contact with each other.

Further, more than one torque change portions 62 may be provided.

In the above embodiment, the back frame 5 is deformed when the rotation torque is changed, but the intermediate ring 2 may be deformed, or both may be deformed.

The torque is changed using the engagement claw 24, but the torque may be changed using a portion different from the engagement claw 24.

The rotation torque is changed using the torque change portion 62 and the elasticity of the back frame 5, but the configuration of changing the rotation torque is not limited to this configuration. Any configuration can be used as long as the configuration is capable of changing a sliding friction between the two sliding portions when attaching a first member to a second member. For example, the engagement claw 24 may be provided with a notch which is open radially outward, and an elastic member (e.g., a flat spring) which protrudes radially inward to fit into the notch, may be provided on the inner circumferential surface of the body 50 of the back frame 5. Specifically, a rotation torque based on a predetermined elastic force is generated when the elastic member slides on the tip end surface 24b of the engagement claw 24. The elastic force decreases when the elastic member fits into the notch. As a result, the rotation torque decreases, as well. The elastic member fits into the notch at the attachment position. After that, when the elastic member leaves the notch, the elastic force increases again, and the rotation torque increases, as well. In such a configuration, too, the rotation torque can be changed so that the rotation torque is larger at a preceding side and a succeeding side of the attachment position, than at the attachment position.

In the above embodiment, the engagement claw 24 is contact with the two projecting portions 63 at the attachment position, but the present disclosure is not limited to this configuration. For example, the space between the two projecting portions 63 in the circumferential direction may be wider than the circumferential dimension of the engagement claw 24, so that the engagement claw 24 can be movable in the space between the two projecting portions 63 in the circumferential direction. In this case, the space between the two projecting portions 63 is the attachment position. In such a configuration, too, the rotation torque can be changed so that the rotation torque is larger at a preceding side and a succeeding side of the attachment position, than at the attachment position. Further, in this configuration, the back frame 5 is not deformed when the engagement claw 24 is located at the attachment position. Thus, the protrusions 51a-54a of the back frame 5 can be reliably brought into contact with the outer circumferential surface of the cylindrical portion 23 of the intermediate ring 2. As a result, misalignment of the optical axis Z of the conversion lens 3 with the central axis Y of the intermediate ring 2 can be further prevented.

The intermediate ring 2 is fastened to the lens barrel 1 with thread, but the present application is not limited to this configuration. For example, the intermediate ring 2 may be fastened to the lens barrel 1 with a screw. In this configuration, too, the rotational load transmitted to the lens barrel 1 can be reduced by adopting the above-described configuration.

In the above embodiment, the intermediate ring 2 and the conversion lens 3 are provided with the marks 27a-27c and 59 for alignment of the positions of the intermediate ring 2 and the conversion lens 3 in the circumferential direction. However, the forms of the marks 27a-27c and 59 are not limited to the forms described in the above embodiment. For example, the marks 27a-27c do not have to be indicated by letters, but may be indicated by figures, such as an arrow. In the case where figures are used, an insertion direction and a rotational direction can also be shown even if the space for marks is small. Further, figures can appropriately indicate the positional relationship between the intermediate ring 2 and the conversion lens 3 in any linguistic areas. The marks 27a-27c and 59 may not even be provided.

As described above, the present disclosure is useful for an attachment structure in which a first member is attached to a second member.

The present disclosure is not limited to the above-described embodiments, and can be modified in various ways unless otherwise deviated from the spirits and the features of the present disclosure. The above-described embodiments have been set forth merely for the purposes of preferred examples in nature, and are not intended to limit the scope, applications, and use of the present disclosure. The scope of the present disclosure is described by the claims, and is not limited by the specification. Deformations and modifications belonging to a range equivalent to the range of the claims are within the scope of the present disclosure.

What is claimed is:

1. An attachment structure configured to attach a first member to a second member by relatively rotating the first member and the second member in a circumferential direction about a predetermined axis, comprising:

a first engagement portion which is provided at one of the first member or the second member and which protrudes in a radial direction with respect to the axis as a center; and a second engagement portion which is provided at the other one of the first member or the second member and which engages with the first engagement portion at least at a predetermined attachment position in the circumferential direction to restrict a relative movement of the first member and the second member in a direction of the axis, wherein one of the first member or the second member at which the second engagement portion is provided, is provided with spaces which allow the first engagement portion to pass by the second engagement portion in the direction of the axis, at both sides of the second engagement portion in the circumferential direction, and the first member and the second member include a torque change portion which changes a torque during the relative rotation between the first member and the second member so that the torque is larger at a preceding side and a succeeding side of the attachment position in the circumferential direction, than at the attachment position.

2. The attachment structure of claim 1, wherein the second member includes, at an opposite side to the first member with respect to the direction of the axis, an attachment portion configured to be attached to a third member by rotation in a first direction of the circumferential direction, and to be detached from the third member by rotation in a second direction of the circumferential direction which is opposite to the first direction.

3. The attachment structure of claim 2, wherein the first member and the second member include a rotation stopper which restricts rotation of the first member when the first member is rotated in the second direction.

4. The attachment structure of claim 3, wherein one of the first member or the second member to which the second engagement portion is provided, includes a third engagement portion which aligns with the first engagement portion in the direction of the axis when the rotation of the first member is restricted by the rotation stopper, and which restricts the relative movement of the first member and the second member in the direction of the axis.

5. The attachment structure of claim 2, wherein the third member is a lens barrel.

6. The attachment structure of claim 5, wherein the first member is an optical component or a lens cap.

7. A lens unit having a conversion lens and an intermediate ring, which are relatively rotated in a circumferential direction about a predetermined axis to attach the conversion lens to the intermediate ring, comprising:

a first engagement portion which is provided at one of the conversion lens or the intermediate ring and which protrudes in a radial direction with respect to the axis as a center; and a second engagement portion which is provided at the other one of the conversion lens or the intermediate ring and which engages with the first engagement portion at least at a predetermined attachment position in the circumferential direction to restrict a relative movement of the conversion lens and the intermediate ring in a direction of the axis, wherein one of the conversion lens or the intermediate ring at which the second engagement portion is provided, is provided with spaces which allow the first engagement portion to pass by the second engagement portion in the direction of the axis, at both sides of the second engagement portion in the circumferential direction, and the conversion lens and the intermediate ring include a torque change portion which changes a torque during the relative rotation between the conversion lens and the intermediate ring so that the torque is larger at a preceding side and a succeeding side of the attachment position in the circumferential direction, than at the attachment position.

8. The lens unit of claim 7, wherein the intermediate ring includes, at an opposite side to the conversion lens with respect to the direction of the axis, an attachment portion configured to be attached to the lens barrel by rotation in a first direction of the circumferential direction, and to be detached from the lens barrel by rotation in a second direction of the circumferential direction which is opposite to the first direction.

9. The lens unit of claim 7, wherein the conversion lens and the intermediate ring include a rotation stopper which restricts rotation of the conversion lens when the conversion lens is rotated in the second direction.

10. The lens unit of claim 9, wherein one of the conversion lens or the intermediate ring to which the second engagement portion is provided, includes a third engagement portion which aligns with the first engagement portion in the direction of the axis when the rotation of the conversion lens is restricted by the rotation stopper, and which restricts the relative movement of the conversion lens and the intermediate ring in the direction of the axis.

* * * * *